US010354398B2

(12) United States Patent
Cai et al.

(10) Patent No.: US 10,354,398 B2
(45) Date of Patent: Jul. 16, 2019

(54) OMNIDIRECTIONAL ROUGHNESS ALGORITHM FOR TOPOGRAPHIC SIGNATURE ANALYSIS OF LUNAR CRATERS

(71) Applicant: Macau University of Science and Technology, Macau (CN)

(72) Inventors: Zhanchuan Cai, Macau (CN); Wei Cao, Macau (CN)

(73) Assignee: Macau University of Science and Technology, Macau (CN)

( * ) Notice: Subject to any disclaimer, the term of this patent is extended or adjusted under 35 U.S.C. 154(b) by 185 days.

(21) Appl. No.: 15/367,158

(22) Filed: Dec. 1, 2016

(65) Prior Publication Data
US 2018/0158202 A1 Jun. 7, 2018

(51) Int. Cl.
*G06K 9/00* (2006.01)
*G06T 7/40* (2017.01)
*G06K 9/46* (2006.01)

(52) U.S. Cl.
CPC ............ *G06T 7/403* (2013.01); *G06K 9/4642* (2013.01); *G06T 2207/20036* (2013.01); *G06T 2207/30184* (2013.01)

(58) Field of Classification Search
CPC .......... G06T 7/403; G06T 2207/30184; G06T 2207/20036; G06T 2207/10032; G06K 9/4642
USPC ...................................................... 382/108
See application file for complete search history.

(56) References Cited

U.S. PATENT DOCUMENTS

| 9,141,113 | B1* | 9/2015 | Ivanov | G05D 1/0676 |
| 2009/0303110 | A1* | 12/2009 | Gregory | G01S 13/86 |
| | | | | 342/25 A |
| 2011/0026832 | A1* | 2/2011 | LeMoigne-Stewart | |
| | | | | G06K 9/4633 |
| | | | | 382/199 |
| 2014/0039855 | A1* | 2/2014 | Rachlin | G02B 23/00 |
| | | | | 703/6 |

OTHER PUBLICATIONS

M.A. Kreslaysky et al, "Lunar topographic roughness maps from Lunar Orbiter Laser Altimeter (LOLA) data: Scale dependence and correlation with geologic features and units", Icarus, vol. 226, pp. 52-66, 2013.*

(Continued)

*Primary Examiner* — Van D Huynh
(74) *Attorney, Agent, or Firm* — Eagle IP Limited; Jacqueline C. Lui

(57) ABSTRACT

A method executed by a computer system to construct an omnidirectional roughness (OR) map of a lunar crater based on a data set of a digital elevation model (DEM) of surface textures of the lunar crater is provided. The method includes setting a center and a first point of the data set, selecting a moving window, utilizing a one point-to-point step when the moving window slides over the DEM, calculating a morphological surface roughness (MSR) that detects a vertical roughness of the lunar crater, calculating a topographic frequency coefficient (TFC) that detects a horizontal roughness of the lunar crater, constructing the OR map, and displaying the OR map to show a surface roughness of the lunar crater.

19 Claims, 25 Drawing Sheets
(21 of 25 Drawing Sheet(s) Filed in Color)

(56) References Cited

OTHER PUBLICATIONS

C.H. Grohmann et al, "Multiscale analysis of topographic surface roughness in the Midland Valley, Scotland", IEEE Transactions on Geoscience and Remote Sensing, vol. 49, No. 4, pp. 1200-1213, 2011.*

J.T. Perron et al, "Spectral signatures of characteristic spatial scale and nonfractal structure in landscapes", Journal of Geophysical Research, vol. 113, No. F04003, 2008.*

M. A. Rosenburg, O. Aharonson, J. W. Head, M. A. Kreslavsky, E. Mazarico, G. A. Neumann, D. E. Smith, M. H. Torrence, and M. T. Zuber, "Global surface slopes and roughness of the moon from the Lunar Orbiter Laser Altimeter," Journal of Geophysical Research, vol. 116, No. E02001, 2011.

M. A. Kreslavsky, J. W. Head, G. A. Neumann, M. A. Rosenburg, O. Aharonson, D. E. Smith, and M. T. Zuber, "Lunar topographic roughness maps from Lunar Orbiter Laser Altimeter (LOLA) data: Scale dependence and correlation with geologic features and units," Icarus, vol. 226, pp. 52-66, 2013.

M. K. Shepard, B. A. Campbell, M. H. Bulmer, T. G. Farr, L. R. Gaddis, and J. J. Plaut, "The roughness of natural terrain: A planetary and remote sensing perspective," Journal of Geophysical Research, vol. 106, No. E12, pp. 32,777-32,795, 2001.

W. Cao, Z. Cai, and Z. Tang, "Lunar surface roughness based on multiscale morphological method," Planetary and Space Science, vol. 108, pp. 13-23, 2015.

D. Stoffler, G. Ryder, B. A. Ivanov, N. A. Artemieva, M. J. Cintala, and R. A. F. Grieve, "Cratering history and lunar chronology," Reviews in Mineralogy and Geochemistry, vol. 60, pp. 519-596, 2006.

P. H. Schultz, "Floor-fractured lunar craters," The Moon, vol. 15, pp. 241-273, 1976.

B. Li, Z. Ling, J. Zhang, J. Chen, Z. Wu, and Y. Ni, "Texture descriptions of lunar surface derived from LOLA data: Kilometer-scale roughness and entropy maps," Planetary and Space Science, vol. 117, pp. 303-311, 2015.

C. H. Grohmann, M. J. Smith, and C. Riccomini, "Multiscale analysis of topographic surface roughness in the Midland Valley, Scotland," IEEE Transactions on Geoscience and Remote Sensing, vol. 49, No. 4, pp. 1200-1213, 2011.

J. T. Perron, J. W. Kirchner, and W. E. Dietrich, "Spectral signatures of characteristic spatial scale and nonfractal structure in landscapes," Journal of Geophysical Research, vol. 113, No. F04003, 2008.

A. M. Booth, J. J. Roering, and J. T. Perron, "Automated landslide mapping using spectral analysis and high-resolution topographic data: Puget Sound lowlands, Washingtom, and Portland Hills, Oregon," Geomorphology, vol. 109, pp. 132-147, 2009.

M. A. Kreslavsky and J. W. Head III, "Kilometer-scale roughness of mars: Results from MOLA data analysis," Journal of Geophysical Research, vol. 105, No. E11, pp. 26,695-26,711, 2000.

M. A. Kreslavsky, J. W. Head, G. A. Neumann, M. T. Zuber, and D. E. Smith, "Kilometer-scale topographic roughness of Mercury: Correlation with geologic features and units," Geophysical Research Letters, vol. 41, pp. 8245-8251, 2014.

W. Fa, Y. Cai, Z. Xiao, and W. Tian, "Topographic roughness of the northern high latitudes of Mercury from Messenger Laser Altimeter data," Geophysical Research Letters, vol. 43, pp. 3078-3087, 2016.

* cited by examiner

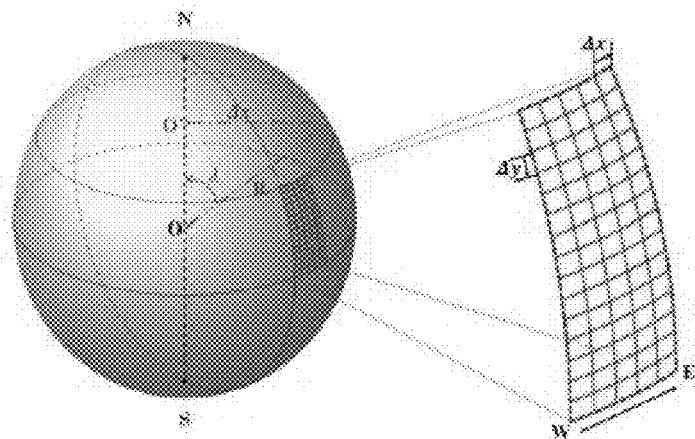
Figure 3A
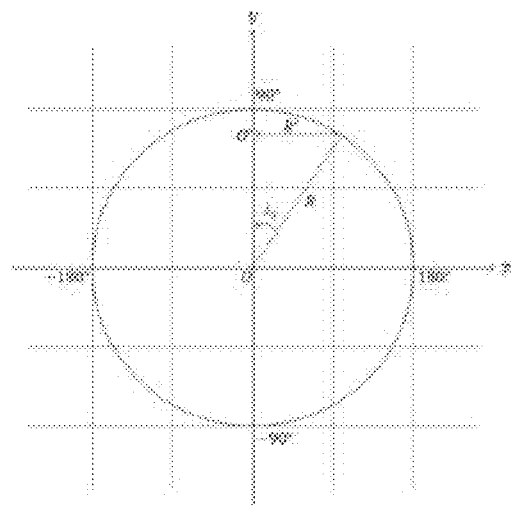 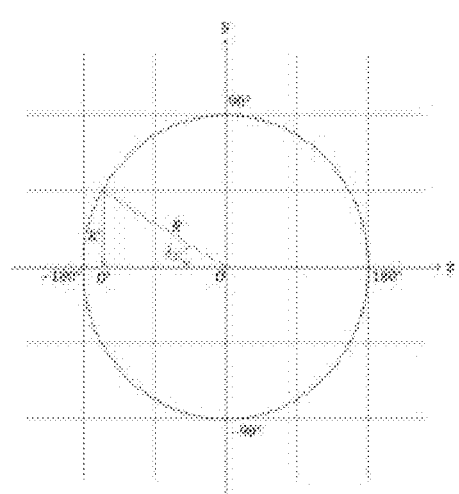
Figure 3B  Figure 3C

900 

---
Algorithm 1 The pseudo code of OR
---

Require:
  Calculate the Morphological Surface Roughness (MSR):
  Set the input digital elevation model by $d$. Determine the primary length $r$ of the disk-shape SE $g$.
  *Construct the SEs:*
1: $k = strel('disk', g(r))$;
  *Calculate tophat and bottomhat transform of d:*
2: $BOTHAT(k) = d \bullet k - d$;
3: $TOPHAT(k) = d - d \circ k$;
4: $MSR = TOPHAT(k) + BOTHAT(k)$;
  Calculate the 2-D FFT:
  Set the input digital elevation model by $d$. Determine the window size $w$.
  *Calculate frequency domain f of d with window size w:*
5: $f = FFT2(d, w, w)$;
  *Calculate the power spectrum p of f:*
6: $p = f^2 / (w * w)^2$;
  Calculate the Omnidirectional Roughness (OR):
7: $OR = p + MSR$;
8: return $OR$.

Figure 9

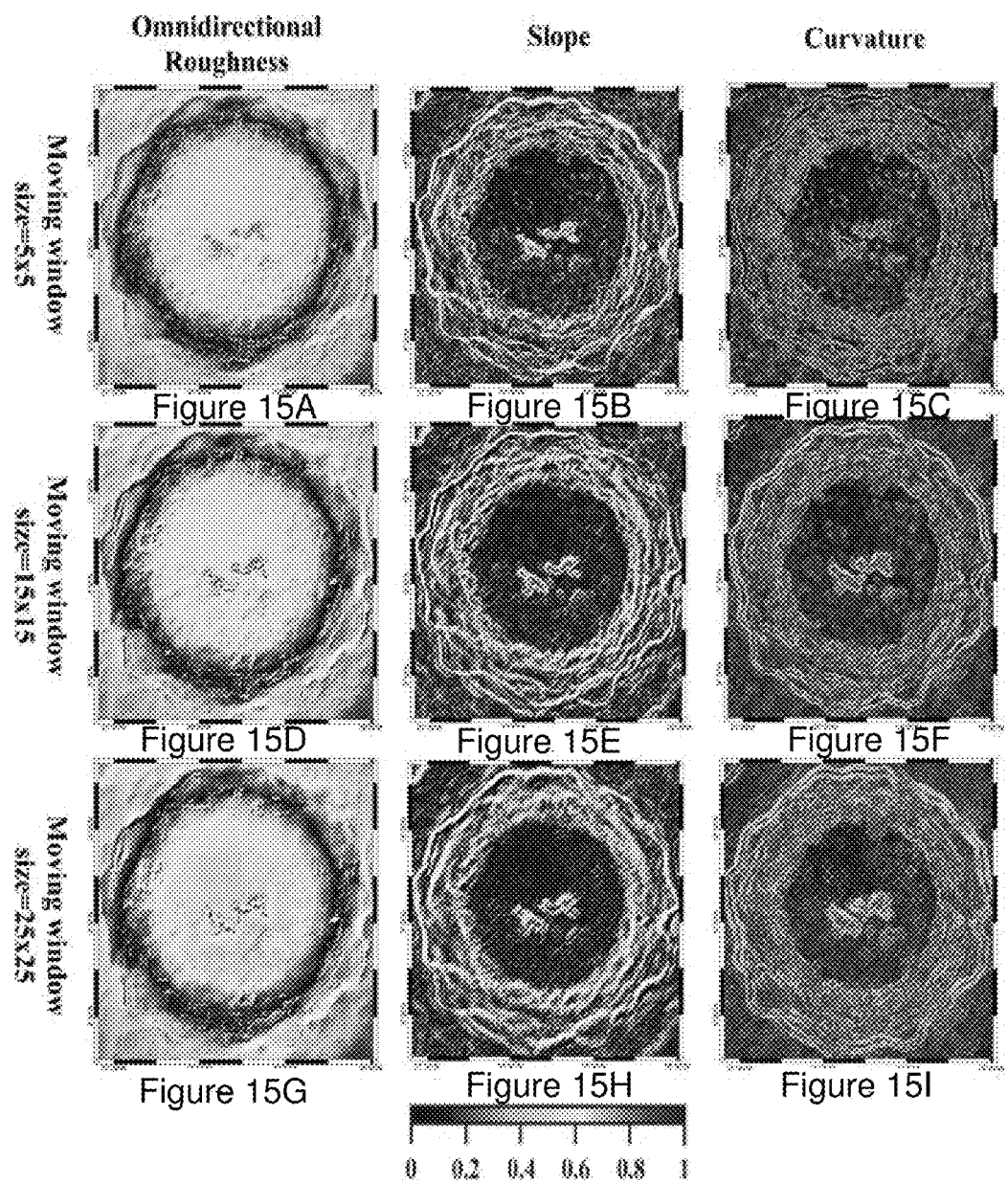

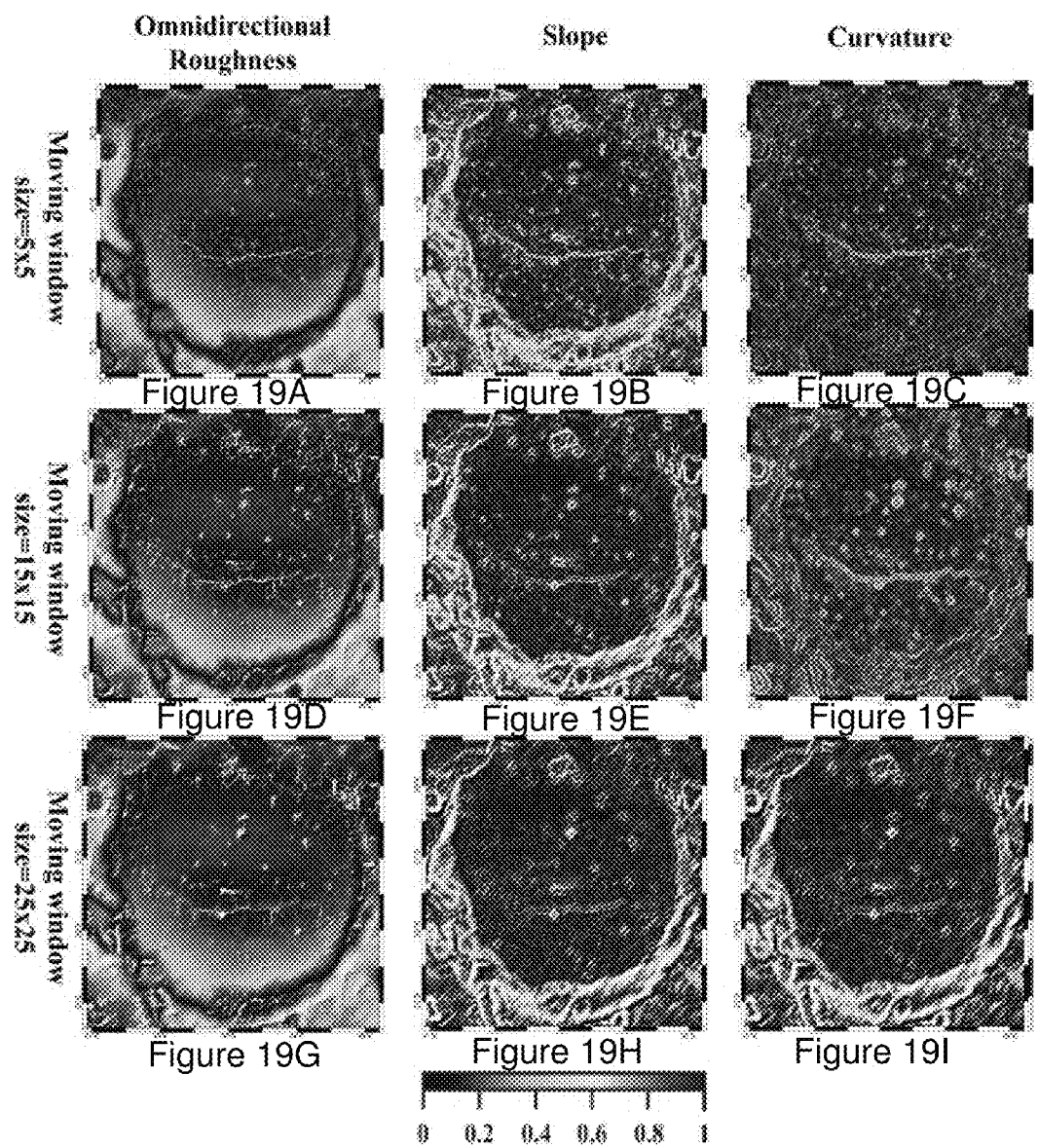

OMNIDIRECTIONAL ROUGHNESS ALGORITHM FOR TOPOGRAPHIC SIGNATURE ANALYSIS OF LUNAR CRATERS

FIELD OF THE INVENTION

The present invention relates to a method to construct an omnidirectional roughness (OR) map of a lunar crater.

BACKGROUND

Surface roughness is a common parameter utilized in Earth and other planetary geoscience. The quantity of surface roughness is sensitive to the source data, requirements of geologists and the used algorithms. No single definition exists that can interpret all styles of roughness variations.

In view of the demand for efficiently analyzing planetary surfaces, improvements in method that analyze surface roughness are desired.

SUMMARY OF THE INVENTION

One example embodiment is a method executed by a computer system to construct an omnidirectional roughness (OR) map of a lunar crater based on a data set of a digital elevation model (DEM) of surface textures of the lunar crater. The method includes setting a center of the data set in (0°N, 0°W) and a first point of the data set in (90°N, 180°W), selecting a moving window, utilizing a one point-to-point step when the moving window slides over the DEM, calculating a morphological surface roughness (MSR) that detects a vertical roughness of the lunar crater, calculating a topographic frequency coefficient (TFC) that detects a horizontal roughness of the lunar crater, constructing the OR map, and displaying the OR map to show a surface roughness of the lunar crater.

Other example embodiments are discussed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 3A to 3C show a computational process of area ratio (AR) in accordance with an example embodiment. FIG. 3A shows a schematic view of an elevation distribution in a spherical coordinate system. The blue parts interpret an overview of calculating a radius of a longitude circle or a latitude circle. FIG. 3B shows a schematic view of computing a longitude circle.

FIG. 3C shows a schematic view of computing a latitude circle.

FIG. 9 shows a pseudo code that outlines a basic algorithm for calculation of OR in accordance with an example embodiment.

FIGS. 15A to 15I show roughness textures of the Copernicus crater by using different roughness measurements with moving windows of different sizes in accordance with an example embodiment.

FIGS. 19A to 19I show roughness textures of the Fracastorius crater by using different roughness measurements with moving windows of different sizes in accordance with an example embodiment.

DETAILED DESCRIPTION

Figure 1A:
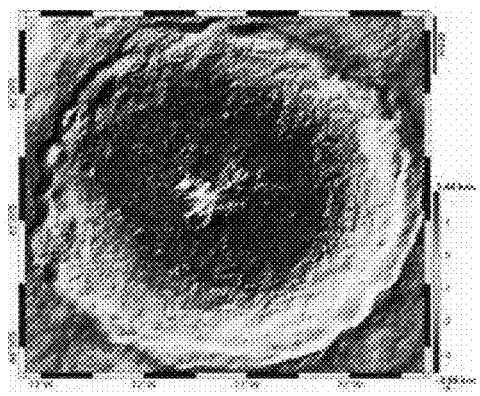
FIGS. 1A to 1H show topographies of selected craters in lunar orbiter laser altimeter (LOLA) Kaguya lunar digital elevation model (SLDEM2015), namely and respectively Tycho, Humboldt, Jackson, Kostinskiy, King, Gassendi, Copernicus, and Fracastorius in accordance with an example embodiment.

Example embodiments relate to apparatus and methods that construct an omnidirectional roughness (OR) map of a lunar crater based on a data set of a digital elevation model (DEM) of surface textures of the lunar crater.

For illustration purposes, example embodiments are discussed with the object being the moon or a surface of the object being a lunar surface. Example embodiments are not limited to the moon and its surface but can be applied to other physical objects and their surfaces as well, such as the Earth and planets.

An example embodiment includes a computer system that generates and displays an OR map of a lunar crater. The computer system includes at least one processor, a display and a non-transitory computer-readable medium having stored therein instructions that when executed cause the processor to generate an OR map from a data set of a digital elevation model (DEM) of surface textures of the lunar crater. The processor further executes the instructions to generate a slope map from the data set of the DEM of the surface textures of the lunar crater, to generate an area ratio (AR) map from the data set of the DEM of the surface textures of the lunar crater, to generate a curvature map from the data set of the DEM of the surface textures of the lunar crater, and to display, on a display, simultaneously the OR map, the AR map, the slope map, and the curvature map.

In one example embodiment, a method executed by a computer system to analyze and display surface roughness of a lunar crater based on a data matrix of a DEM of surface textures of the lunar crater is provided. The method includes constructing an OR map of the lunar crater by the computer system, constructing an AR map of the lunar crater by the computer system, constructing a slope map of the lunar crater by the computer system, constructing a curvature map of the lunar crater by the computer system, and displaying the OR with the AR map, with the slope map, and with the curvature map to analyze the surface roughness of the lunar crater by the computer system.

Surface roughness provides important clues to understand topographic features of planetary surfaces. Surface roughness is utilized as a surface parameter to characterize individual landforms. In different topo-graphic datasets, surface roughness is defined based on the requirements analysis. For instance, root-mean-square (RMS) height is used as a roughness parameter to interpret the effects of spatial resolution on the surface backscattering characteristics of polarimetric radar. In planetary roughness analysis, the proposed algorithms are highly sensitive to the source data. Based on shot-to-shot data, global roughness maps were first produced by using a range of surface parameters. These roughness maps indicate significant slope characteristics of global topographic signatures. However, these results only reflect large-scale roughness variations of lunar topography. Topographic textures in typical areas look fuzzy. Other similar works are utilized in Reduced Data Records, Precision Experiment Data Records and Gridded Data Records. The principle of a good roughness measurement is quite subjective, because different source data have individual problems and different researchers have different personal requirements. A successful geological usage of roughness maps relies on a suitable roughness measurement and optimal mapping technology.

Digital Elevation Models (DEM or DEMs) are source data that are useful for the extractions of surface textures through statistical processing. Surface roughness of DEMs is described by some surface parameters such as slope and aspect. Lunar Orbiter Laser Altimeter (LOLA) collects a large number of elevations that represents a high-resolution global model of lunar topography. The original data is generated as standard data products at multiple resolutions for terrain analysis. A high-resolution DEM is generated by LOLA DEMs and Kaguya DEMs. This dataset is available for extractions of typical terrains. Therefore, a targeted roughness measurement is necessary for future terrain analysis in this gridded data or higher-resolution homogeneous data.

In addition to the effect of DEMs (e.g. resolution and interpolation between gaps), a reasonable roughness measurement should possess some stable properties. Several useful measurements are provided to compute surface roughness of lunar surface. Most of them indicate the roughness variations by typical elevation differences at a given moving window. In other words, these roughness measurements highlight local topographic signatures based on some prominent elevation characterizations. One point in a roughness matrix means the interaction between the point and its surrounding points, which are calculated based on a size of a moving window. However, previous roughness measurements represented roughness textures by using local prominent standard deviations. One of the typical roughness measurements is based on RMS. To reflect roughness feature in a three-dimensional DEM, a method used to solve this problem is box-counting dimension. However, this method is not convincing because the selection of scales are under doubt and the calculated values change disorderly when the numbers of scales become larger.

In one example embodiment, a roughness signature of a lunar crater is divided into two parts: a horizontal variation (fluctuation and undulation of z in x-y plane) and a vertical variation (z-direction). A point z of roughness texture can be affected by other points in a given moving window, because the distributions of z (i.e. ups and downs of a surface) indicate complicated morphologies in the x-y plane and reflect horizontal roughness variations. By way of example, Fast Fourier Transform (FFT) is used to solve this problem. This statistical assessment of elevation distribution is utilized as a Topographic Frequency Coefficient (TFC). Further, morphological roughness provides a reasonable interpretation of vertical roughness variations. Thus, in one example embodiment, the roughness values can reflect the information in all directions of a three-dimensional space, and this new roughness measurement is called Omnidirectional Roughness (OR) measurement.

Lunar impact craters reflect the most common and major topographic features on planetary surfaces. The record of impact craters on lunar surface, which indicates abundant size-frequency distributions and spatial densities, has been widely used for age estimation, analysis of crustal and/or mantle composition and history of lunar landscape morphologies. The newest global topographic product, which is called as lunar orbiter laser altimeter (LOLA) Kaguya lunar digital elevation model (SLDEM2015), is generated based on the LOLA elevation data and the stereoderived DEMs from the SELENE Terrain Camera (TC). This global dataset is generated with rectangular grids at horizontal resolutions of 256 pixels by 256 pixels and 512 pixels by 512 pixels. This high-resolution topographic data has been improved for extractions of various types of terrain, because SLDEM2015 uses TC DEM to fill gaps between tracks. In one example embodiment, a center of SLDEM2015 is set in (0°N, 0°W) so that the first point of this data matrix is (90°N, 180°W), which is convenient for terrain extractions.

FIGS. 1A to 1H show digital elevation maps of the craters extracted from SLDEM2015. These topographic data reserve the highest-resolution topographic details of the impact craters. Based on a lunar time-calibrated lunar stratigraphy, the craters are extracted into two types for analysis: Young craters that include Tycho, Jackson, King and Copernicus (as shown in FIGS. 1A to 1D respectively), and old craters that include Humboldt, Kostinskiy, Gassendi and Oppenheimer (as shown in FIGS. 1E to 1H respectively). FIG. 2 shows Table 200 that enumerates basic information of all selected craters. Copernican craters are young and all of them have age estimations. Other craters are Floor-fractured Craters (FFCs). The morphologies of these craters provide impact clues for the analysis of volcanic processes.

Young craters attract great interest of crater analysis because their structures can be easily identified or classified by observations in images or DEMs. The geological processes of these craters are simpler than old craters and provide significant clues for unique topographic unit analysis. By way of example, behavior of the Al-Tusipond melt deposit in the King crater region is analyzed. The statistics of secondary craters and ray system of Tycho crater is provided. In one example embodiment, the production function for small secondary craters are obscured by mass wasting and the statistic results of the ray craters potentially can be mapped to avoid for age estimation.

Figure 1B:
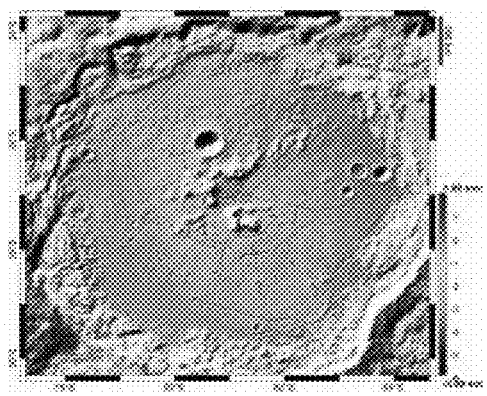
Figure 1C:
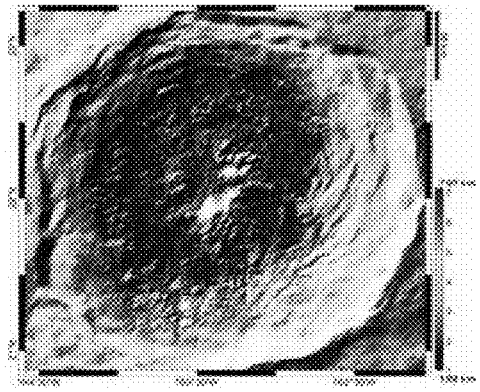
Figure 1D:
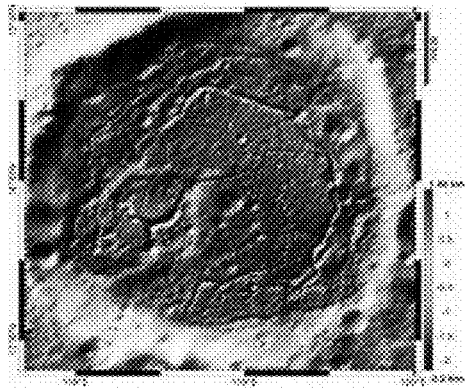
Figure 1E:
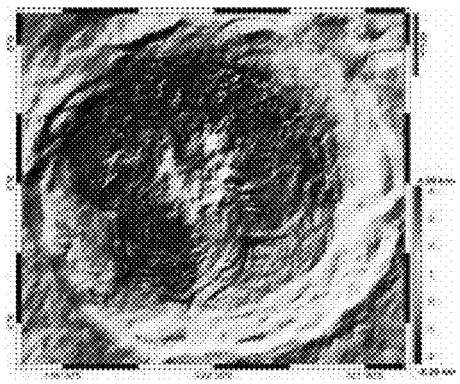
Figure 1F:
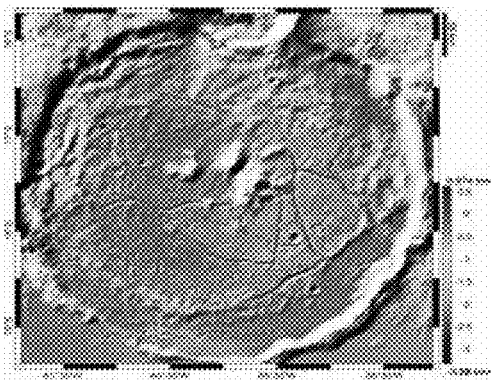
Figure 1G:
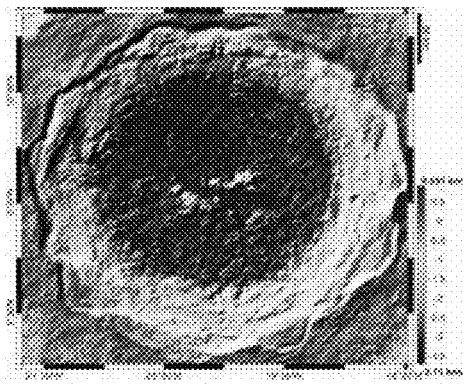
Figure 1H:
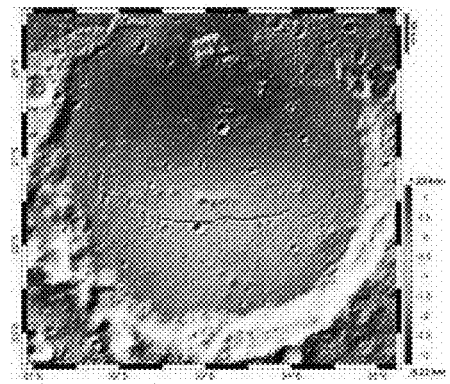
Figure 2:
FIG. 2 shows a table that provides a list of impact craters in accordance with an example embodiment.

In another example embodiment, the craters of Tycho (as shown in FIG. 1A), Jackson (as shown in FIG. 1C), King (as shown in FIG. 1E) and Copernicus (as shown in FIG. 1G) are young and fresh impact craters in the Copernican period (0.8 Gyr). The elevation ranges of these craters ranges from −3.55 to 1.84 kilometers (km) for Tycho, 1.02 to 7.07 km for Jackson, −2.26 to 4.09 km for King, and −3.71 to 0.851 km for Copernicus, respectively. In these craters, the main topographic feature is reflected by their bright ray deposits. By way of example, Copernicus craters indicate one of the most prominent bright rayed structures on lunar surface. On the other hands, the inner physical properties of these craters show high surface temperatures of rock abundance derived from LRO Diviner Radiometer data.

As shown in Table 200 in FIG. 2, FFCs have older ages than young craters. A large number of FFCs, whose floors have been uplifted as floating on an intruded sill and modified volcanically by mare flooding, are found. Most of the FFCs (e.g. 65%) are distributed on the nearside of the Moon. These craters are divided into 6 classes. Depth-to-diameter relationship is utilized to compare the FFCs and young craters. In one example embodiment, it can be summarized that FFCs show significantly shallower floors than those of the fresh impact craters. Most of roughness characteristics can be observed in the concentric fractures and crater walls as shown in FIGS. 1A to 1H. Unlike young craters, most of the FFCs do not have central peaks. By way of example, in view of these prominent topographic features of FFCs, FFCs are used as samples of old craters.

As a brief introduction of selected FFCs according to FIGS. 1A to 1H and Table 200 in FIG. 2, Humboldt (as shown in FIG. 1B) is a classic Class 1 FFC. The central peak complexes can be observed clearly and there are wide wall terraces. Kostinskiy (as shown in FIG. 1D) is the largest Class 2 crater with a diameter of 67.91 km. The most prominent topographic signature is the wide moat in crater interior. Gassendi (as shown in FIG. 1F) is a Class 3 crater with significant wide moat structure in inner floor and some uplifted bulks. Fracastorius (as shown in FIG. 1G) is a Class 6 crater with a semilunar edge and the distinctive mare-flooded interior.

Surface roughness calculation depends not only on the algorithm, but also on the modelling of scale effects with changing spatial resolution or varying window size. This analyzed method is called multiscale analysis. The fundamental objective of the multiscale analysis is to extract topographic signatures on different spatial scales from DEMs (or DTMs) and describe the complexity of surfaces as a synthetic overview of those in individual terrains. This analyzed method is developed for lunar roughness extraction.

In one example embodiment, the scale detection is difficult to determine by a simple mathematical algorithm because it is difficult to objectively prove whether the selected scales are characteristic or not. In another example embodiment, as observed from Table 200 of FIG. 2, the sizes of lunar craters are quite different. The length of the maximum scale cannot exceed the size of the minimum lunar crater Kostinskiy (with a diameter 67.91 km; 572×592 pixels in SLDEM2015) and the visualized sharpness of roughness signature should be significant.

In an example embodiment, to evaluate the roughness effects in reasonable spatial scales, the selected sizes of the moving windows are 5×5, 7×7, 9×9, 11×11, 13×13, 15×15, 17×17, 19×19, 21×21, 23×23, and 25×25, 27×27 pixels, respectively. In another example embodiment, one point-to-point step is utilized when the moving windows are sliding over the DEMs.

The feasibility and availability of a roughness measurement can be explained by comparing the roughness measurement with the other measurement methods. Most of the lunar maps show significant 1-D roughness signatures, which are limited by the anisotropy features of the source data. In one example embodiment, a resetting work to apply some roughness measurements to characterize 2-D roughness textures is implemented based on a newest 3-D lunar gridded DEM (SLDEM2015). In another example embodiment, typical roughness values can be treated as geomorphometric variables. By way of example, area ratio, mean slope, and mean curvature are reset for comparisons.

The area ratio is a ratio between a surface area (i.e. real surface area) and a projective area of square cells that is defined as flat and defined by input data. SLDEM2015 represents global topography by using cylindrical projection. The highest difficulty for the computation is that the rectangular grids of elevations are arranged by degrees in an x-y plane. It means that the spacings (in meters or kilometers) in a given longitude or latitude are not the same as those in neighboring latitudes or longitudes.

An example embodiment to solve the problem is to consider all the points distributed in a spherical coordinate system. In an example embodiment, spacings along the longitudes are defined as $\Delta x$ and spacings along the latitudes are defined as $\Delta y$. A neighboring spacing of $\Delta x$ is $\Delta x'$ and a neighboring spacing of $\Delta y$ is $\Delta y'$. As shown in the blue on FIG. 3A, all the spacings are calculated in the longitude or latitude circles. In one example embodiment, coordinate points of the boundaries in four directions (i.e. a Northernmost direction, a Southernmost direction, an Easternmost direction and a Westernmost direction) are obtained based on the coordinate information provided by the International Astronomical Union (IAU) (http://planetarynames.wr.usgs.gov/Page/MOON/target).

FIGS. 3B and 3C reveal a computational processing of the spacings Δx and Δy in one example embodiment. A latitude value of a corresponding longitude circle at position i ($N_i$) is calculated by:

$$N_i = N_{most} - (i-1)\Delta f_N$$

wherein $N_{most}$ denotes a northernmost latitude, $\Delta f_N$ has an amount of 1/256 degree, and $(i-1)\Delta f_N$ is a distance from the $N_{most}$ to a point in (i−1) position. A longitude value of a corresponding latitude circle at position i ($W_i$) is calculated by:

$$W_i = W_{most} + (i-1)\Delta f_W$$

wherein $W_{most}$ denotes a westernmost latitude, $\Delta f_W$ has an amount of 1/256 degree, and $(i-1)\Delta f_W$ is a distance from the $W_{most}$ to a point in (i−1) position. A distance of angle from the $N_{most}$ to the point in (i−1) position in a longitude circle ($\lambda_i$) is calculated by:

$$\lambda_1 = N_{most} - N_i (N_i \geq S_{most})$$

wherein $S_{most}$ denotes a southernmost latitude. A distance of angle from the $W_{most}$ to the point in (i−1) position in a latitude circle (λ2) is calculated by:

$$\lambda_2 = W_{most} + W_i (W_i \leq E_{most})$$

wherein $E_{most}$ denotes an easternmost latitude. The length of Δx is calculated by:

$$\Delta x = 2\pi R \left| \sin\left(\frac{\pi}{2} - \lambda_1\right)/(N-1) \right|$$

wherein N is an amount of a row of the data matrix. The length of Δy is calculated by:

$$\Delta y = 2\pi R |\cos(\pi + \lambda_2)/(M-1)|$$

wherein M is an amount of a column of the data matrix.

Figure 4:
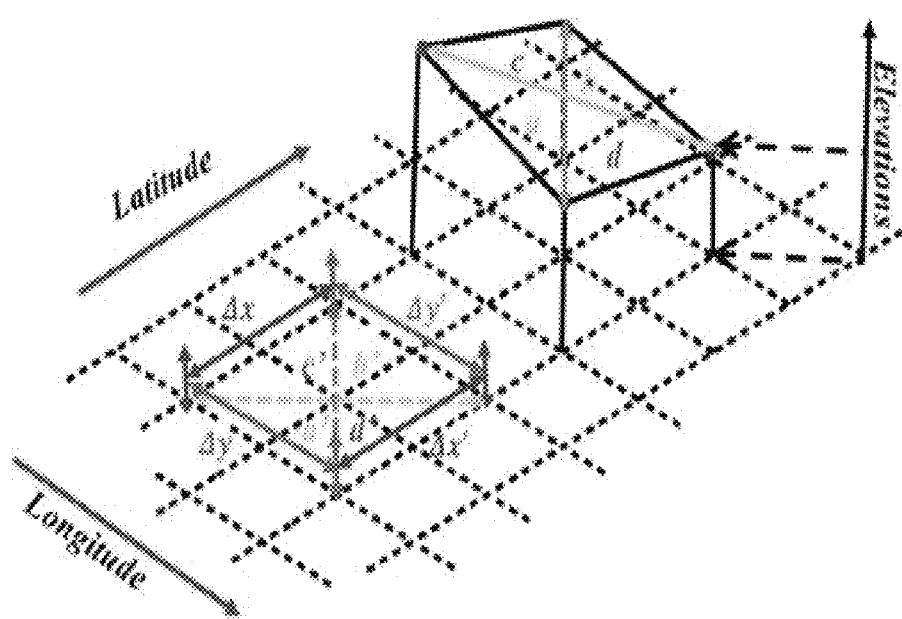
FIG. 4 shows a sketch map of the computation of AR in accordance with an example embodiment.

In one example embodiment, a topography is divided into two triangles in order to estimate the real area and the projective area. FIG. 4 shows that triangular areas ($s_{\Delta a}$, $s_{\Delta b}$, $s_{\Delta c}$ and $s_{\Delta d}$) and the gridded background areas $s_{\Delta a}^t$, $s_{\Delta b}^t$, $s_{\Delta c}^t$ and $s_{\Delta d}^t$ in the lunar surface can be computed using the Heron's formula and the Pythagorean theorem based on the obtained values of Δx, Δy, Δx' and Δy', and an elevation z. The triangular areas $s_{\Delta a}$ and $s_{\Delta b}$ are calculated by dividing the projected area along a yellow line, whereas the triangular areas $s_{\Delta c}$ and $s_{\Delta d}$ are calculated by dividing the projected area along a blue line. The gridded background areas $s_{\Delta a}^t$ and $s_{\Delta b}^t$ are calculated by dividing the real area along a yellow line, whereas the gridded background areas $s_{\Delta c}^t$ and $s_{\Delta d}^t$ are calculated by dividing the real area along a blue line.

In an example embodiment, an area ratio (AR) map is constructed by:

$$AR = MAX\left(\frac{s_{\Delta a} + s_{\Delta b}}{s_{\Delta a}^t + s_{\Delta b}^t}, \frac{s_{\Delta a} + s_{\Delta b}}{s_{\Delta c}^t + s_{\Delta d}^t}, \frac{s_{\Delta c} + s_{\Delta d}}{s_{\Delta a}^t + s_{\Delta b}^t}, \frac{s_{\Delta c} + s_{\Delta d}}{s_{\Delta c}^t + s_{\Delta d}^t}\right)$$

Figure 5A:
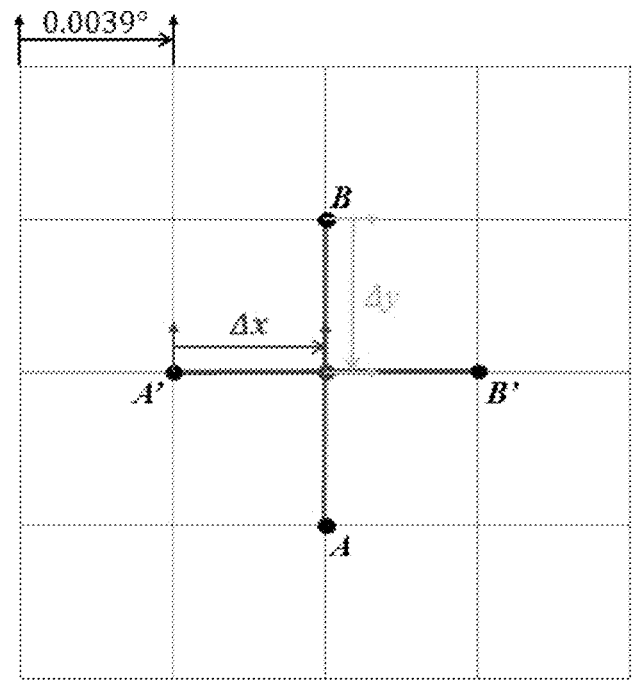
FIG. 5A shows a slope or curvature calculation in the SLDEM2015 in accordance with an example embodiment.
Figure 5B:
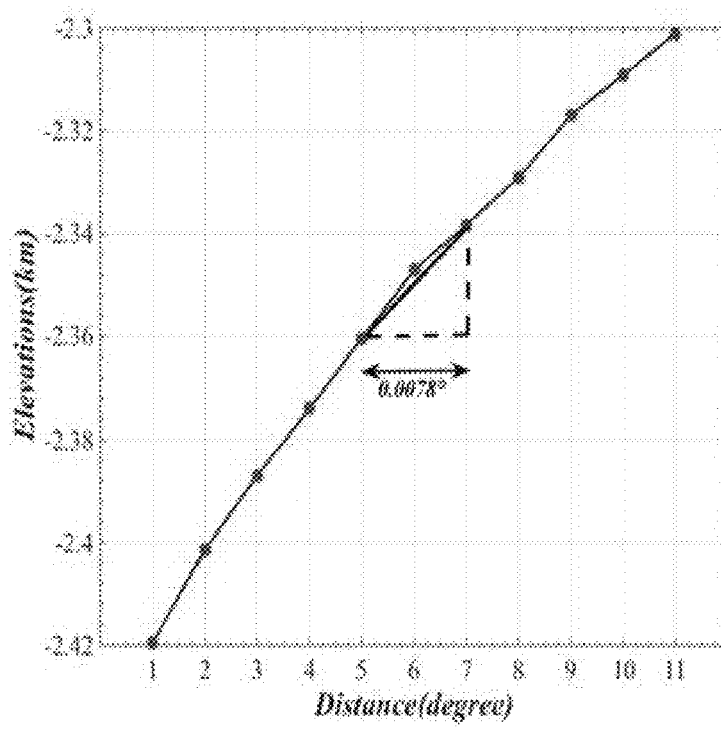
FIG. 5B shows a computation of the slope with a direction in the SLDEM2015 in accordance with an example embodiment.

Surface slope is used in the study of planetary surface and the effect of geological processes. The curvature is also utilized for the analysis of water-ice-rich mantle and mapping global lunar roughness map. Slope is a first derivative of the elevations z with respect to any aspect direction θ, and the curvature is a second derivative of z with θ. In an example embodiment, θ is equal to a merged result of x and y directions. As shown in FIGS. 5A and 5B, the slope is defined as the elevation difference of the neighboring elevations, $h_A$ and $h_B$ (or $h_{A'}$ and $h_{B'}$), divided by a baseline (i.e. a distance between the two elevations, Δx in a longitude circle or Δy in a latitude circle).

In one example embodiment, a mean slope ($s_x$) between two neighboring elevations in an x-direction ($h_{A'}$ and $h_{B'}$) is calculated by:

$$s_x = \frac{h_{A'} - h_{B'}}{2\Delta x},$$

while a mean slope ($s_y$) between two neighboring elevations in a y-direction ($h_A$ and $h_B$) is calculated by:

$$s_y = \frac{h_A - h_B}{2\Delta y}.$$

A slope map is calculated by:

$$s = \sqrt{(s_x)^2 + (s_y)^2}.$$

The curvature is the derivative of the slope. In one example embodiment, a mean curvature ($d_x$) between two neighboring slopes in the x-direction ($s_{A'}$ and $s_{B'}$) is calculated by:

$$d_x = \frac{s_{A'} - s_{B'}}{2\Delta x},$$

while a mean curvature ($d_y$) between two neighboring slopes in the y-direction ($s_A$ and $s_B$) is calculated by:

$$d_y = \frac{s_A - s_B}{2\Delta y}.$$

A curvature map is calculated by:

$$d = \sqrt{(d_x)^2 + (d_y)^2}.$$

Figure 6:
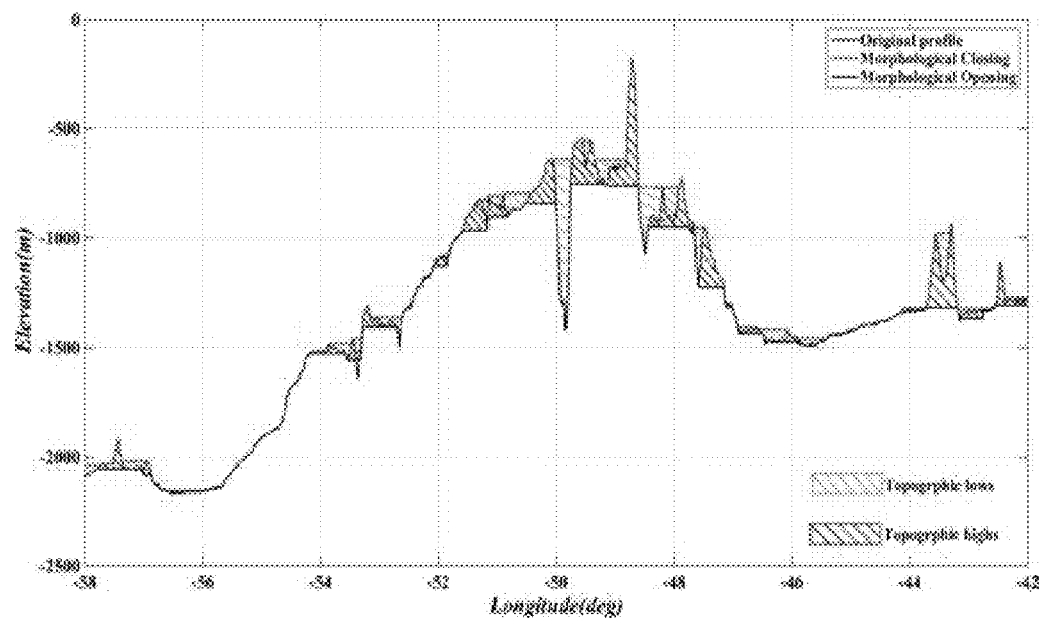
FIG. 6 shows a schematic overview of the computation of morphological surface roughness (MSR) in accordance with an example embodiment

Morphological Surface Roughness (MSR) is used for lunar roughness analysis in high-resolution gridded elevation models. In an example embodiment, two morphological operations, a closing morphological operation ($R_{closing}(l)$) and an opening morphological operation ($R_{opening}(l)$), are used to detect topographic lows (i.e. valley and craters) and topographic highs (i.e. peaks and wrinkle ridges) respectively. In each of these morphological operations, a value of each point in an output data is calculated by a comparison of the corresponding points in the input data with its neighbors. As shown in FIG. 6, the difference between the closing morphological operation and the opening morphological operation is defined as surface roughness (or MSR) and calculated by:

$$MSR = R_{closing}(l) - R_{opening}(l).$$

wherein l is a size of a structuring element. By way of example, SE is a known shape for determining the local calculated regions when it rolls over the DEMs. Further, in FIG. 6, a topographic profile extracted from a high-resolution a digital elevation model (DEM) with a resolution of 256 pixels/deg. The line-shaped structuring element (SE) with the size of 128 point-to-point distance is used. The regions of surface roughness are filled by oblique lines. Morphological closing (red profile) extracts the topographic lows (areas covered by yellow oblique lines), and morphological opening (black profile) extracts the topographic highs (areas covered by green oblique lines).

For one-dimensional profiles, the SE affects roughness extraction only by its size, while the shape and size should be considered in two-dimensional extraction of roughness characteristics. In one example embodiment, a rectangular SE is used because SLDEM2015 is arranged by rectangular grids and topographic frequency coefficient (TFC) is computed in a rectangular local region, although this resetting may lead to a small instability as disk-shape SE could provide the most reasonable visual shapes of roughness textures.

Roughness measurements based on elevation differences can provide intuitive observations to interpret topographic signatures of DEMs. However, all these measurements are limited by some directional drawbacks, which may be caused by the source data or the algorithm. Although MSR can highlight local prominent roughness characteristics, this measurement can only characterize variations in the vertical direction (i.e. z-axis). The complexity of a surface must be omnidirectional.

Figure 7:
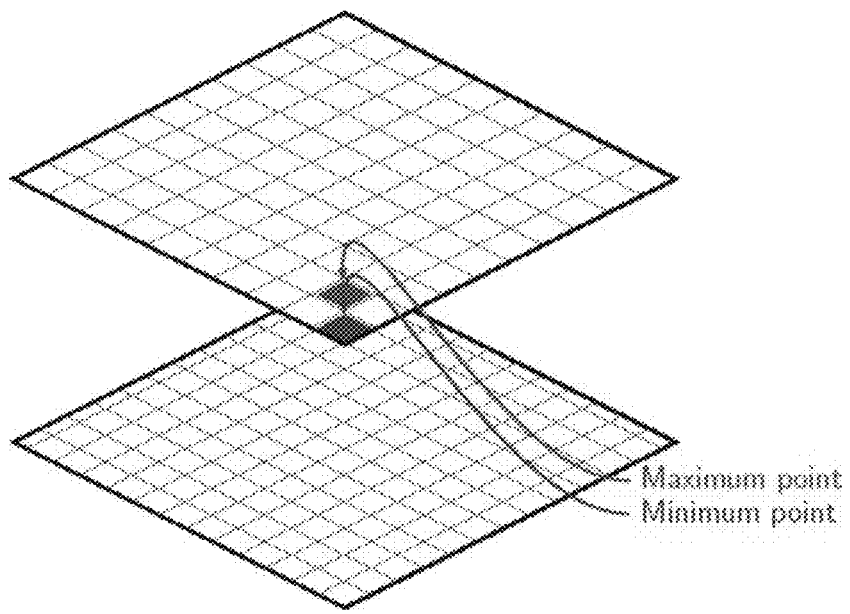
FIG. 7 shows two calculated areas in a given moving window that have overlapping elevation in accordance with an example embodiment. The maximum and minimum points are the same and so their MSR values are the same.

In other words, DEMs characterize topography in a rectangular coordinate system with an x-axis, a y-axis and a z-axis. Local variations in the z direction (i.e. slope and curvature) are the focus in such measurements. Area ratio potentially shows a reasonable application for characterizing surface roughness, but it is difficult to compute a reliable and accurate result in the special structure of the SLDEM2015. Moreover, although MSR can provide significant observations of various roughness signatures in global topographic mapping, some topographic textures are not intuitive. For instance, roughness map of Tycho has some stripes with low roughness values, which indicate unreasonable roughness variations. One of the potential reasons may be the curvature interpolations used in the LOLA data. These problems are resolved in the SLDEM2015. Another reason is that MSR is sensitive to the local maximum and minimum elevations as shown in FIG. 7.

Figure 8:
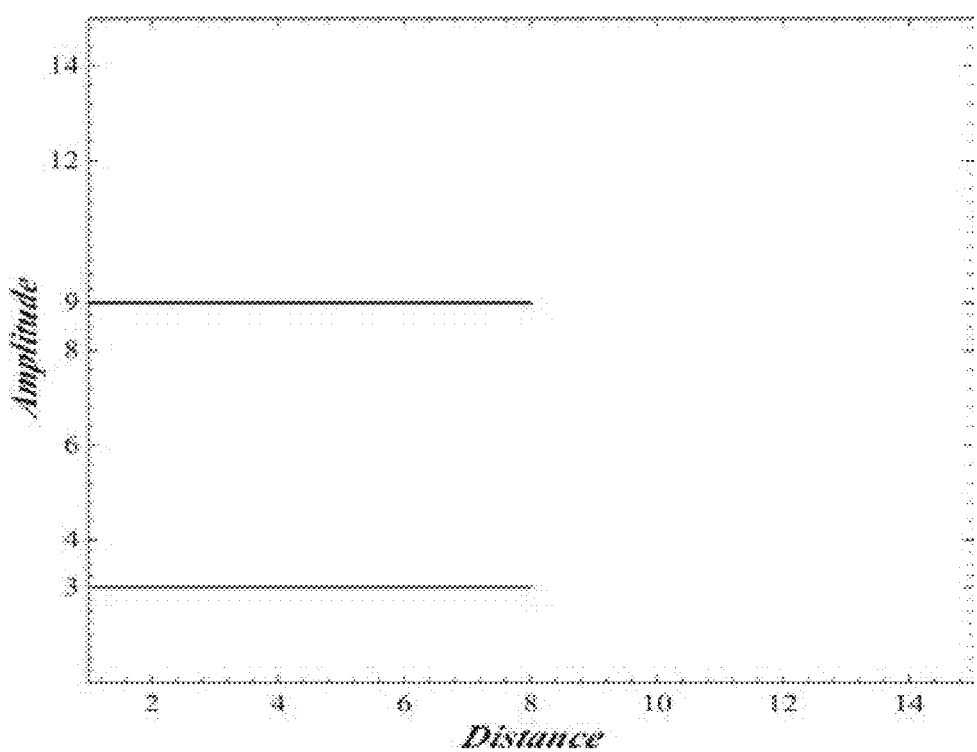
FIG. 8 shows an effect of a zero-frequency component in accordance with an example embodiment.

In an example embodiment, fast Fourier Transform (FFT), which can quantify all the elevations in moving windows, is used to analyze the complexity of a surface in an x-y plane to avoid directional effect. Spectral analysis is used in planetary surfaces. The Fourier function can transform the topographic data from the spatial domain to the frequency domain, so that the roughness signatures can be easily interpreted by the frequency changes with different scales. In one example embodiment, the Fourier power spectrum is a statistical measure to describe how the variance of z (i.e. elevations in DEMs) varies with frequency. In SLDEM2015, which is a two-dimensional data set z (x, y)), the discrete Fourier transform (DFT) provides a roughness description by using a moving window of size $w_x \times w_y$, in which a moving step of the moving window is the interval of the SLDEM2015 (i.e. 0.0039°). By way of example, a spectrum of a DFT in the moving window of a size of $w_x \times w_y$ is calculated by:

$$z_{DFT}(x, y) = \sum_{m=x-\frac{w_x}{2}}^{x+\frac{w_x}{2}} \sum_{n=y-\frac{w_y}{2}}^{y+\frac{w_y}{2}} z(m, n) e^{-2\pi i \left(\frac{xm}{N_x} + \frac{yn}{N_y}\right)}$$

wherein z are elevations in DEM, $N_x$ are elevation numbers of z in the x-direction, $N_y$ are elevation numbers of z in the y-direction, m and n are indices of z, x and y are center indices in each of the moving window, and $Z_{DFT}$ is a sequence of components that describes the spectrum of DFT. The effect of a zero-frequency component must be removed. For example, as shown in FIG. 8, two flat profiles indicate the same roughness variations but their amplitudes are different (i.e. 9 and 3). For this type of profiles, other components are 0 except for the zero-frequency components. Thus, the calculated values of these two profiles are 72 and 24. In an example embodiment, the zero-frequency component is shifted to the center of spectrum $Z_{DFT}$ and its value is set as 0.

The TFC is calculated by:

$$TFC = \sqrt{\sum \frac{1}{N_x^2 N_y^2} (z_{DFT})^2}$$

wherein the TFC is a summed unit of amplitudes squared and can be used to describe the amplitudes of the frequency components of z.

In an example embodiment, the OR is defined as a merged value of the TFC and the MSR, and is calculated by:

$$OR = \sqrt{(TFC)^2 + (MSR)^2}.$$

The values of the TFC and the MSR (in kilometers or meters) may not have the same units of quantities. Therefore, the result matrixes are rescaled to a range between 0 to 1, which are successfully used for surface roughness computation. In one example embodiment, the values of the OR is set within a range of 0 and $\sqrt{2}$. By way of example, each point in the roughness matrix refers to a roughness variation of the local region determined by a given moving window, as shown in Table 900 of FIG. 9.

FIGS. 10A to 10D show an initial result in one example embodiment. Roughness textures of Tycho crater are calculated and mapped by using the methods discussed above, where the roughness values are calculated by using a 13×13 moving window. In order to provide a convenient comparison, all the roughness values are normalized from 0 to 1.

Figure 10A:
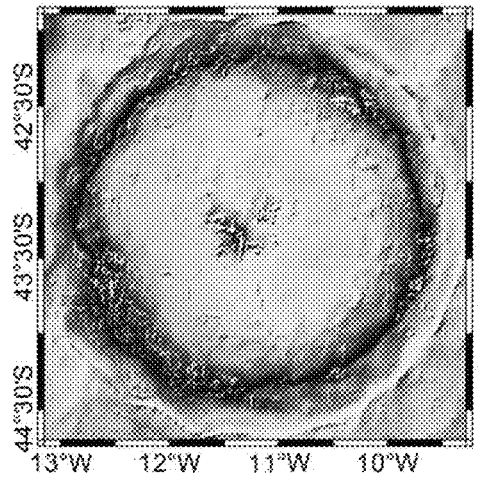
FIGS. 10A to 10D show maps of different roughness measurements with a moving window of size 13×13 in accordance with an example embodiment.
Figure 10B:
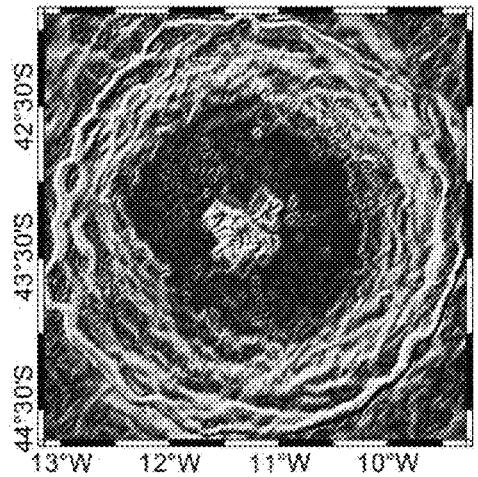
Figure 10C:
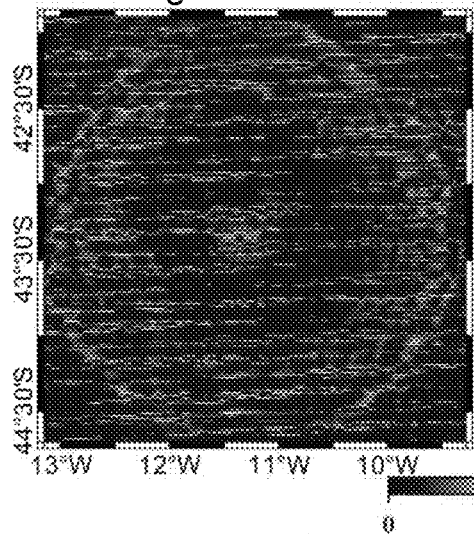

As show in FIG. 10C, roughness measurement by area ratio (AR) fails to distinguish the typical topographic variations with peculiar noises (kermesinus strips). The reason of these noise is that the lengths Δx, Δy, Δx' and Δy' (as shown in FIG. 4) have different lengths in meters (m). In order to avoid this effect, slope and curvature are calculated with a baseline 118 m×118 m (the distance between two points at the equator). However, for AR calculation, this definition is not suitable because the calculated values are not acceptable theoretically and this approximation leads to computation error. On the other hand, the textural contrasts of the AR are very small so all the normalized values are extended 1000 times to highlight the roughness contrast. Even so, the map of AR (as shown in FIG. 10C) is so fuzzy for geological study.

Figure 10D:
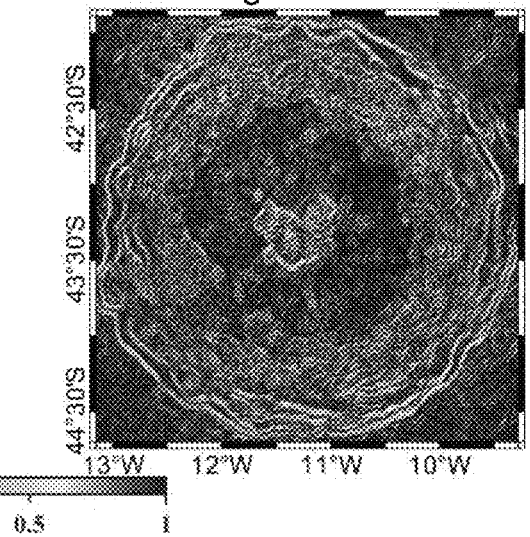

Roughness measurements by slope and curvature show clearer visual sharpness of roughness textures. Slope is very sensitive to a local increase of vertical variances. As shown in FIG. 10B, crater rims and central peak of Tycho crater indicate most roughness contrasts of this map. Geological units in other regions show subtle roughness variations. Most of this regions are considered as a flat surface. Different from slope, curvature (as shown in FIG. 10D) indicates more roughness variations in the inner floor of crater. The observation of curvature map shows that there are many irregular and complicated topographic variations happened in central floor, surface of crater walls and central peak.

Figure 11A:
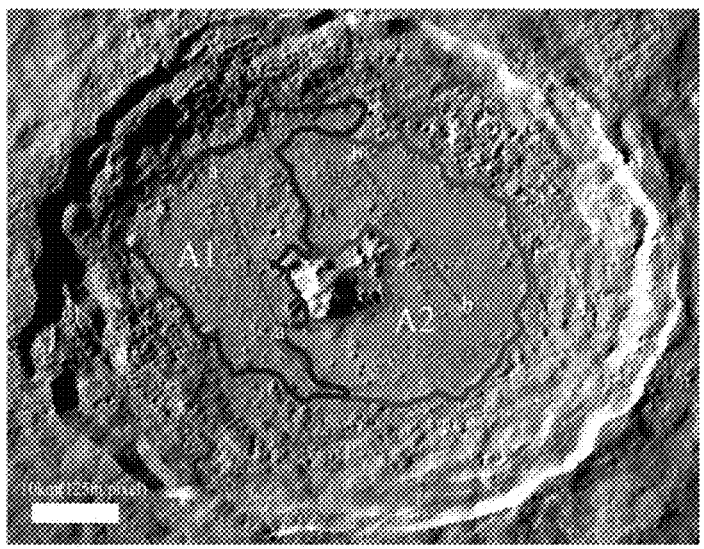
FIG. 11A shows an LROC NAC high resolution image (125 m/pixel) of a Tycho crater from a Narrow Angle Camera (NAC) of the Lunar Reconnaissance Orbiter Camera (LROC) in accordance with an example embodiment.

As illustrated in FIG. 10A, the omnidirectional roughness (OR) map shows that the crater floor is not really flat and smooth. As shown in FIG. 11A, A1 indicates rough and high densities of rock and fragment distributions, while A2 shows a flatter and smooth morphology. The slope map (as shown in FIG. 10B) and the curvature map (as shown in FIG. 10B) show similar morphologies. However, two sampling profiles, a-a' and b-b', are extracted from the image for comparison and the observational result is quite different from the previous measurements. The a-a' profile shows the maximum elevation difference as 185 m, and a higher value (219 m) can be found in b-b' profile. An intuitive comparison between a-a' and b-b' by observing their morphologies indicates that the roughness variations, affected by complicated fractured structures (i.e. ups and downs in FIGS. 11B to 11C), almost look the same and are hard to distinguish by naked eyes. In an example embodiment, the OR map can provide a significant overview of the roughness contrasts in A1 and A2. In these two regions (A1 and A2), the effect of vertical variations (elevation differences) is subtle. Most of the roughness characteristics are represented by horizontal variations. As a result, a mean roughness contrast in A2 (with a mean value of 0.7353) is a little higher than a mean roughness contract in A1 (with a mean value of 0.5776), which accords with the observational analysis of the sampling profiles (a-a' and b-b'). Moreover, the steep walls (i.e. regions marked by blue-color shade in FIG. 10A) show low roughness values because their surfaces look flat, especially in the bright regions that are local in the east-southern part of the crater (as shown in FIG. 11A). Although they indicate high vertical roughness variations (as shown in FIGS. 10B and 10D), most of these regions are more affected by horizontal variations (as shown in FIG. 10A). On the other hand, some fragmented roughness shapes can be observed in the east-northern and the west-northern parts of the roughness texture. These areas have strong vertical roughness variations and associate with bright rocks or fractured units potentially (as shown in FIG. 11A).

Description of the results of the multiscale analysis is divided into two parts: (1) observational comparisons of different roughness measurements (i.e. omnidirectional roughness, slope and curvature) with moving-windows of sizes 5×5, 15×15, and 25×25, respectively. As discussed before, roughness measurement by the area ratio (AR) fails to provide a reasonable intuitive observation of roughness texture. Therefore, the results of AR are not used in this part; (2) statistical interpretations of the multiscale roughness signatures are represented by the plots of normalized median values and normalized standard deviations (SDs) versus the sizes of the moving-window. By way of example, median value is utilized as a quantificational interpretation since the output roughness textures indicate the asymmetric distributions. SD is a parameter in topographic analysis.

As a brief overview of multiscale roughness textures, most roughness variations are concentrated in crater rims slope and curvature maps. Most of the roughness textures in crater floors are ignored or fuzzy. OR map can provide more details of the variations in the crater floor. As discussed above, these regions are more affected by horizontal roughness variations. Thus, the roughness textures are most reflected by TFC. Even so, small craters and high-fractured areas indicate prominent vertical variations in the morphological surface roughness (MSR). The crater rims show clear and prominent roughness signatures in all moving-window sizes. Young craters, represented by the Tycho crater (as shown in FIGS. 12A to 12I), the Jackson crater (as shown in FIGS. 13A to 13I), the King crater (as shown in FIGS. 14A to 14I), and the Copernicus crater (as shown in FIGS. 15A to 15I) show higher OR variations than FFCs, represented by the Humboldt crater (as shown in FIGS. 16A to 16I), the Kostinskiy crater (as shown in FIGS. 17A to 17I), the Gassendi crater (as shown in FIGS. 18A to 18I), and the Fracastorius crater (as shown in FIGS. 19A to 19I).

Figure 11B:
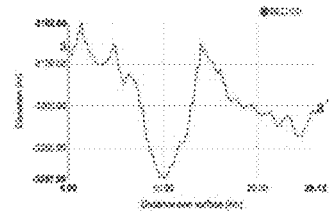
FIGS. 11B to 11C show a-a' and b-b' profiles extracted from GLD100 DEM for geological study in accordance with an example embodiment.
Figure 11C:
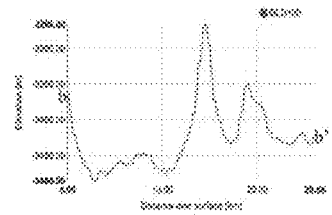
Figures 12A, 12B, 12C, 12D, 12E, 12F, 12G, 12H, 12I:
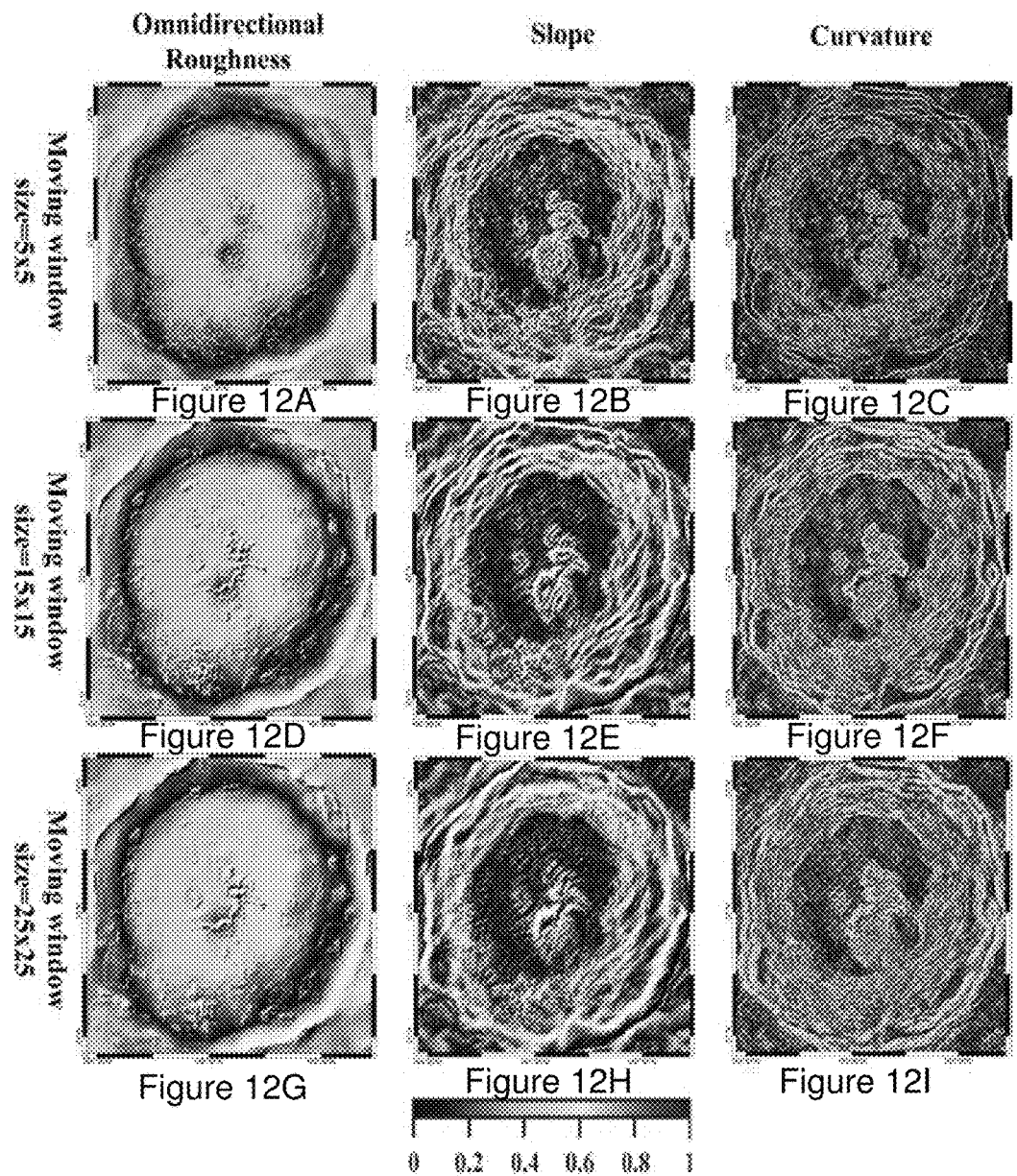
FIGS. 12A to 12I show roughness textures of the Tycho crater by using different roughness measurements with moving windows of different sizes in accordance with an example embodiment.
Figures 13A, 13B, 13C, 13D, 13E, 13F, 13G, 13H, 13I:
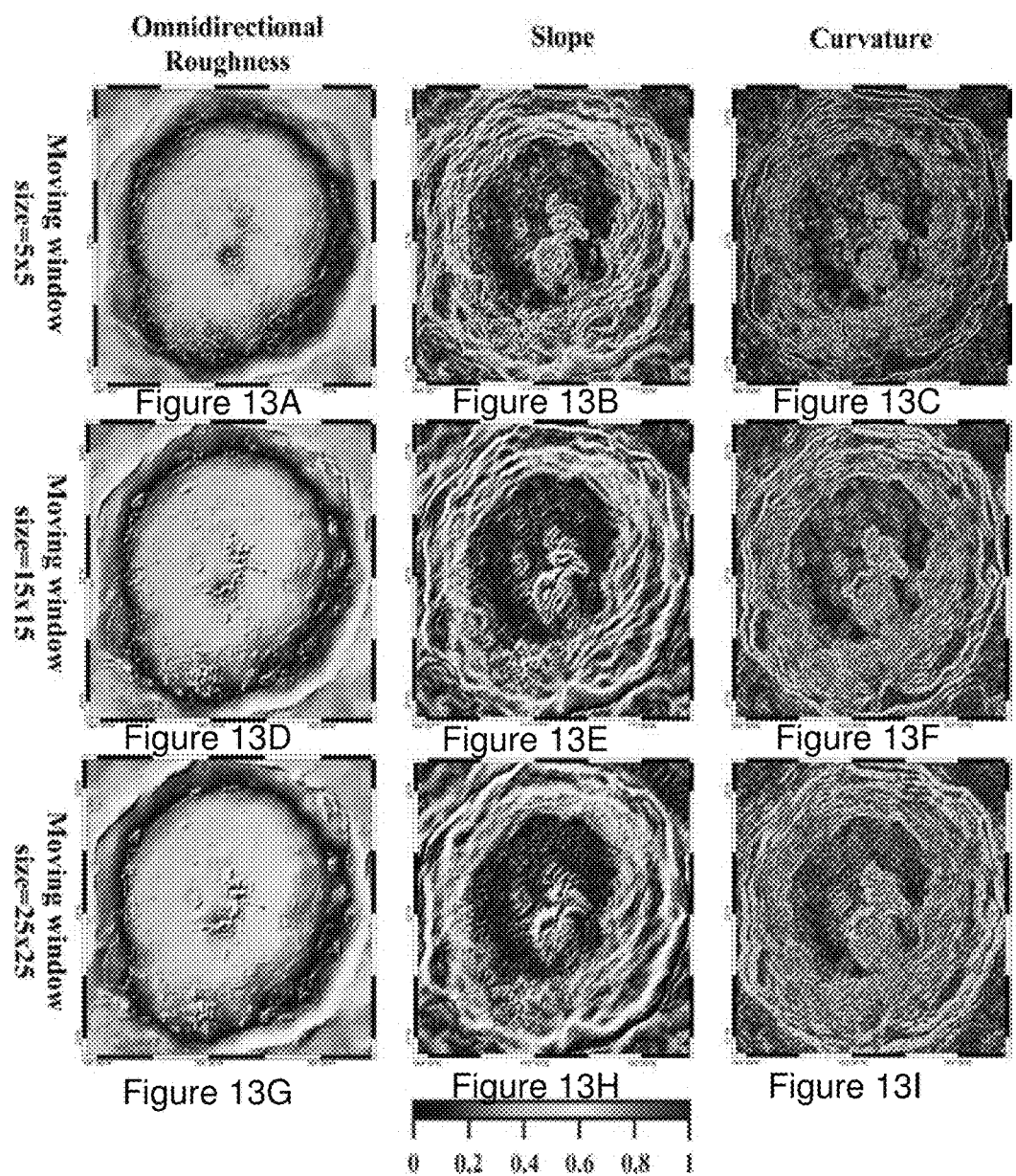
FIGS. 13A to 13I show roughness textures of the Jackson crater by using different roughness measurements with moving windows of different sizes in accordance with an example embodiment.
Figures 14A, 14B, 14C, 14D, 14E, 14F, 14G, 14H, 14I:
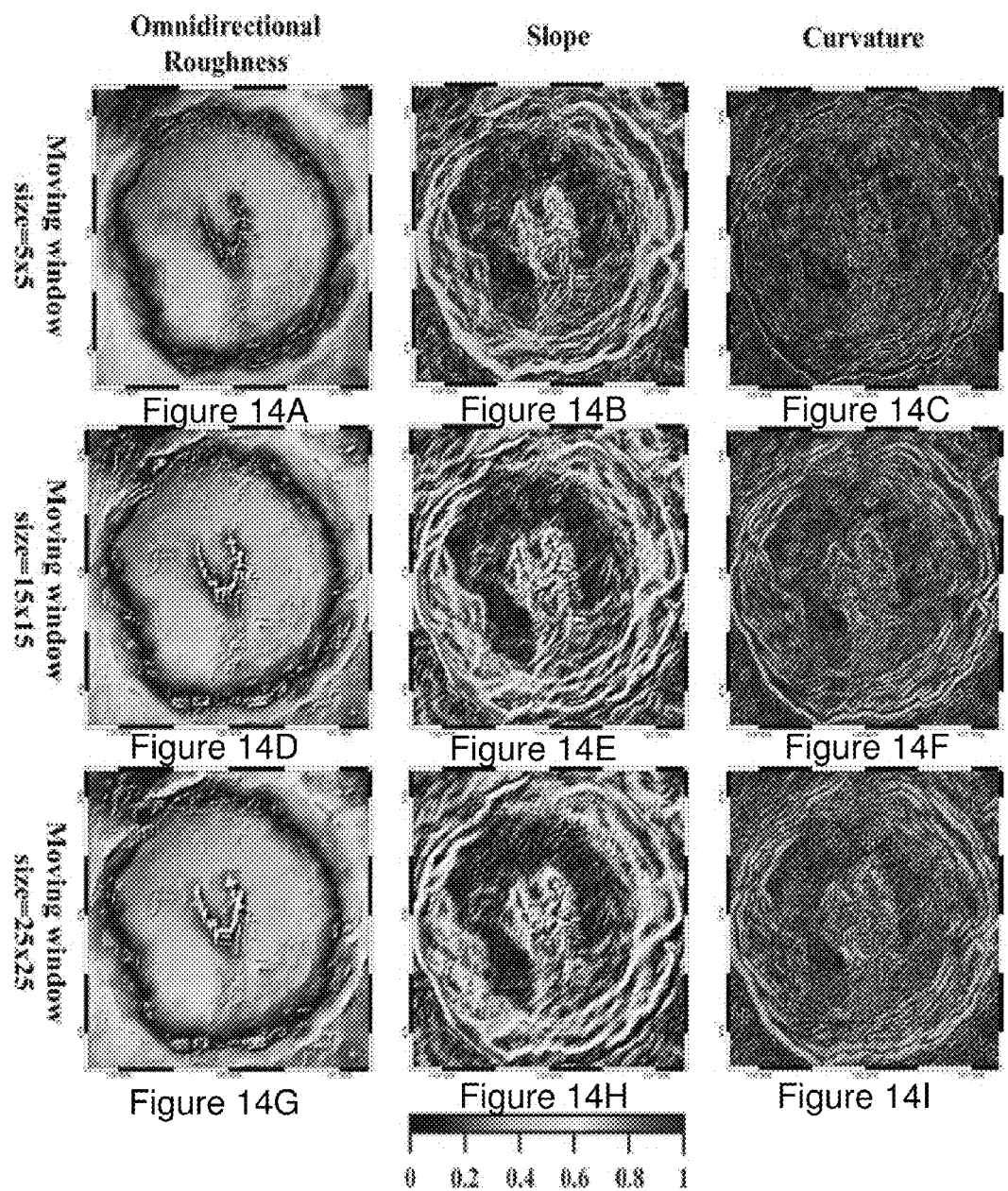
FIGS. 14A to 14I show roughness textures of the King crater by using different roughness measurements with moving windows of different sizes in accordance with an example embodiment.
Figures 16A, 16B, 16C, 16D, 16E, 16F, 16G, 16H, 16I:
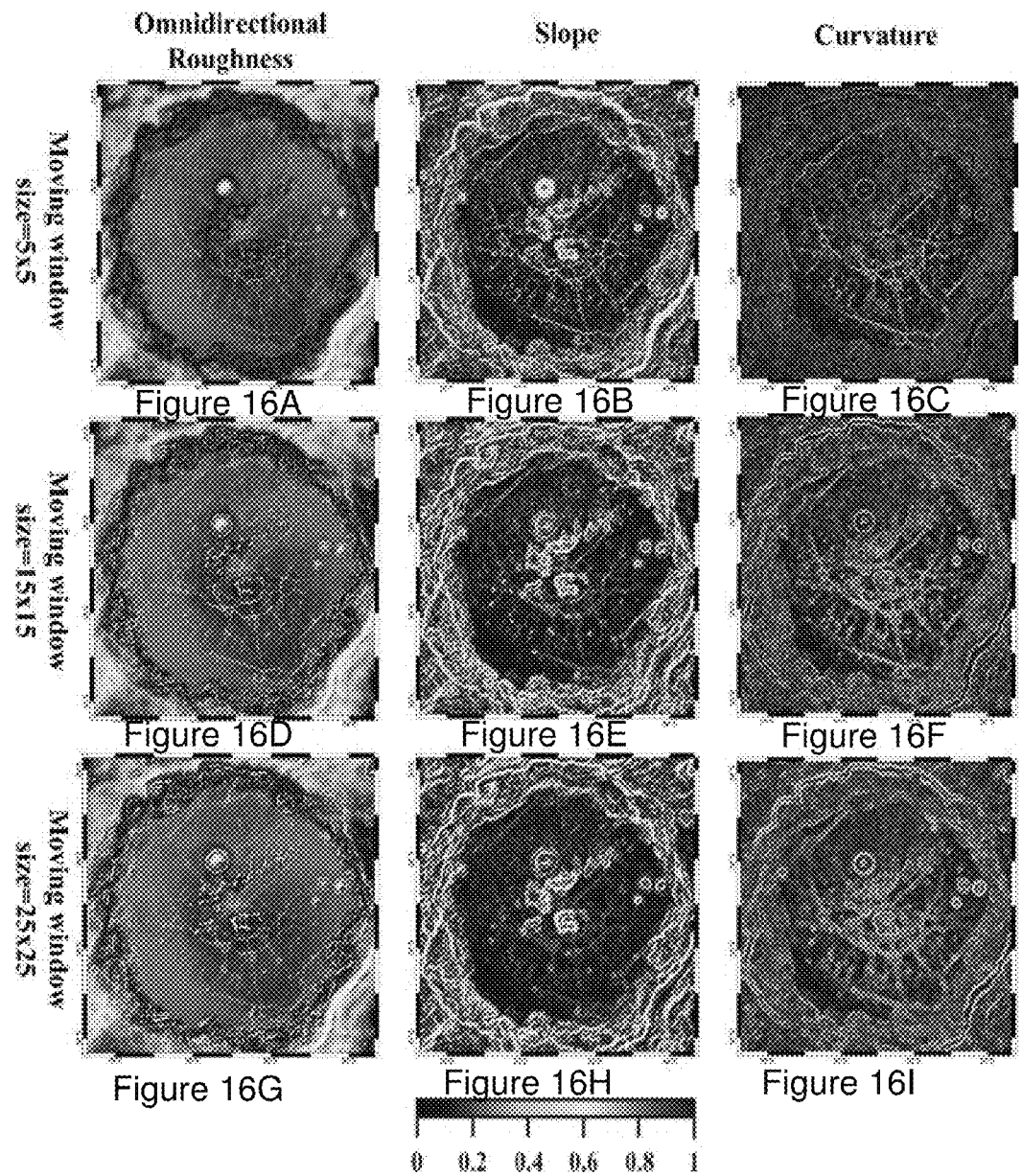
FIGS. 16A to 16I show roughness textures of the Humboldt crater by using different roughness measurements with moving windows of different sizes in accordance with an example embodiment.
Figures 17A, 17B, 17C, 17D, 17E, 17F, 17G, 17H, 17I:
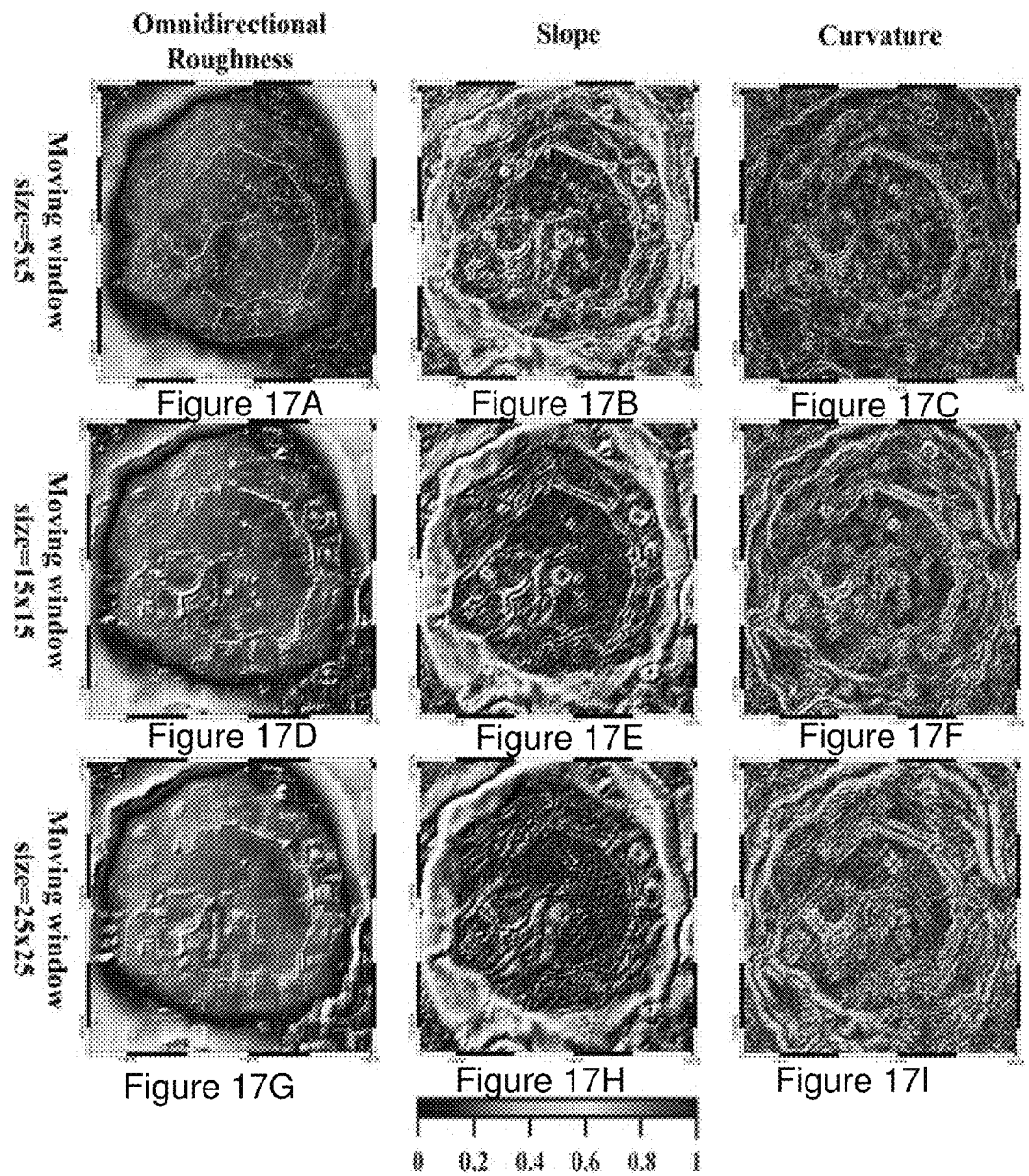
FIGS. 17A to 17I show roughness textures of the Kostinskiy crater by using different roughness measurements with moving windows of different sizes in accordance with an example embodiment.
Figures 18A, 18B, 18C, 18D, 18E, 18F, 18G, 18H, 18I:
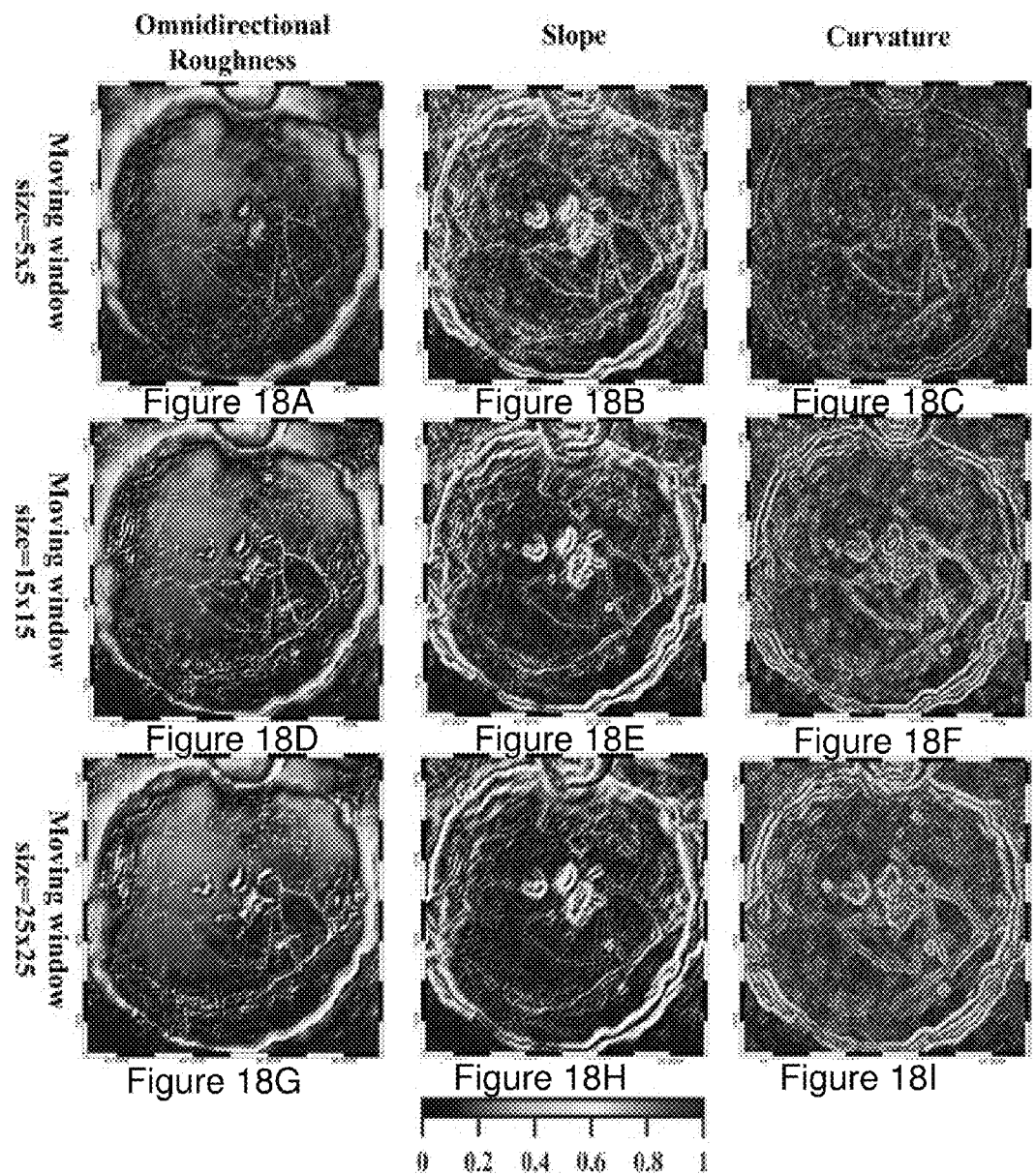
FIGS. 18A to 18I show roughness textures of the Gassendi crater by using different roughness measurements with moving windows of different sizes in accordance with an example embodiment.
Figure 20A:
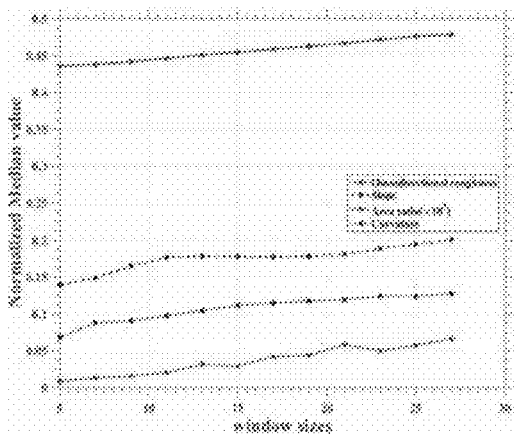
FIGS. 20A to 20H show normalized median roughness values of sampling craters versus different moving-window sizes in accordance with an example embodiment.
Figure 20B:
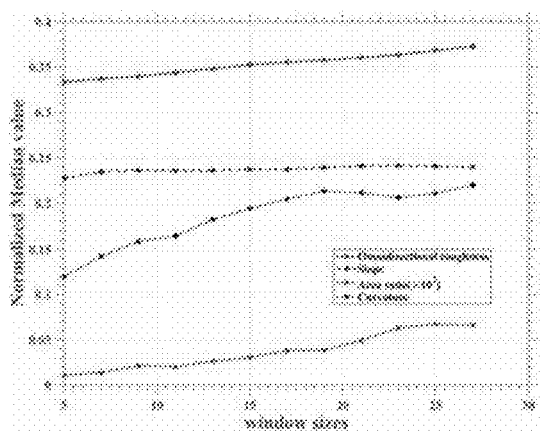
Figure 20C:
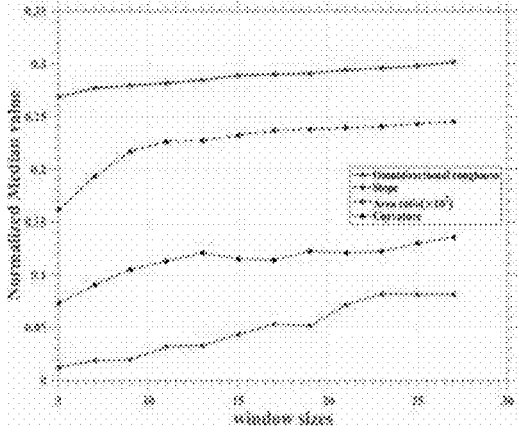
Figure 20D:
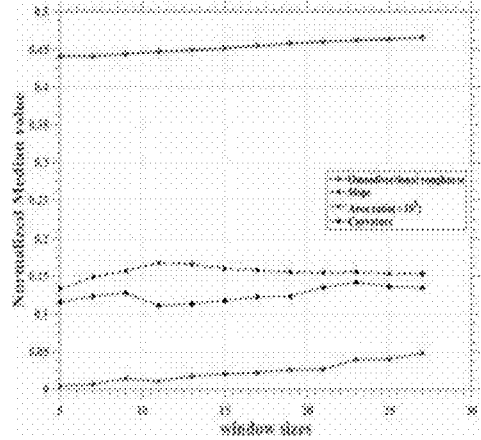
Figure 20E:
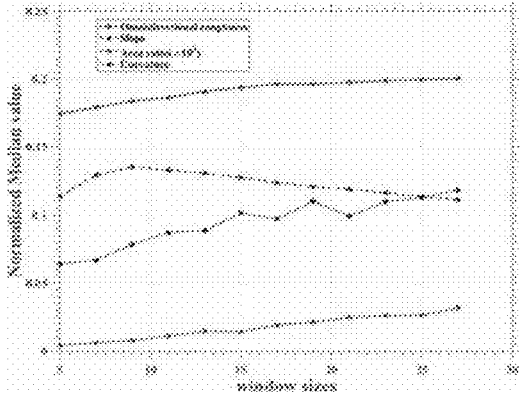
Figure 20F:
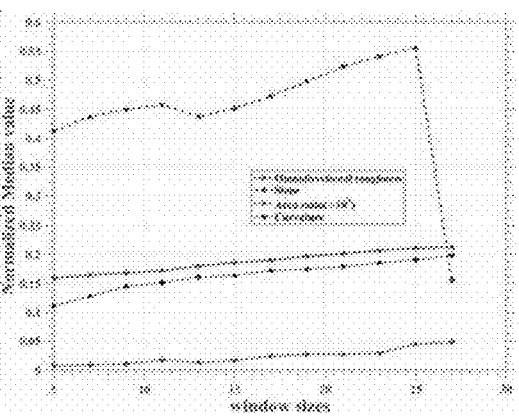
Figure 20G:
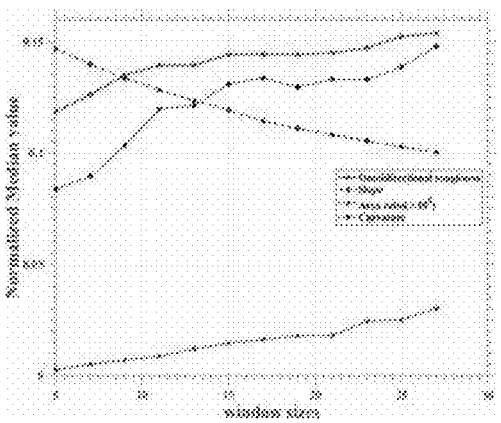
Figure 20H:
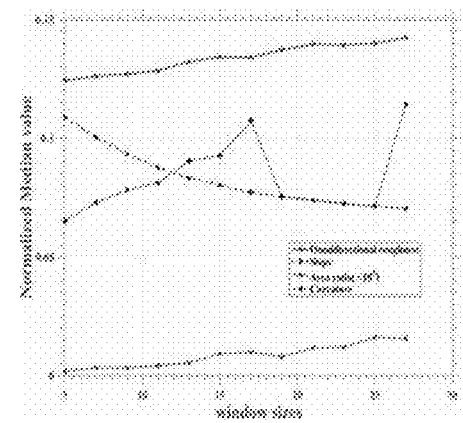

For young craters, Tycho, Jackson, King and Copernicus, they have clear ray system (with filamentous and high-albedo deposits) and high rock abundance. Roughness textures in crater rims and interior floor represent stable shapes when the sizes of the moving windows increase. Crater rims are reflected by vertical roughness variations. The prominent changes can be observed in the slope and the curvature maps. When the moving-window sizes increase, the roughness contrasts in the crater rims are clearer and the roughness values are higher. The local roughness textures, which represent higher roughness variations, overlap their neighbors and enhance the roughness contrast between the crater rims and other units in the craters. OR maps also show that the crater rims indicate prominent roughness characteristics. The difference is that the terrace wall does not show high roughness contrast. As shown in FIGS. 11A to 11C, surfaces of the terrace walls (bright and dark regions) do not look complicated and rough, although these regions have steep slopes. The curvature maps show that most of the high roughness contrasts appear in the fractured parts between the terraces. The roughness effects of these units are less than the interior changes in the surfaces or terraces in the OR maps, especially for some sharp and bright fragmented units and rocks. Moreover, the central peaks of the craters have prominent roughness signatures in the slope maps, while the curvature maps indicate a small difference. For example, as shown in FIGS. 11A to 11C, the prominent roughness signature marks the edges between the peaks and the crater floor by the curvature maps. The top profiles (i.e. lines between bright and dark parts) have lower roughness values. The OR maps provide more reasonable roughness distributions of these variations. The roughness distributions of the observation in the top profiles can be displayed clearly.

For FFCs, these craters do not have prominent central peaks and most of the distinct geological units have the interior fractured structures. The crater floors of FFCs are shallower than the crater floors of the young craters. The modification occurs primarily to their floors. These units can be represented in the OR maps as shown in FIGS. 16A to 19I. Crater floors of the small craters and the fractured channels reflect prominent roughness characteristics, which are most likely caused by vertical roughness effects (higher elevation differences). Areas covered by light-blue-color shades (with normalized values of nearly 0.4) denote higher floor deposit distributions than those in their surroundings. These deposit distributions are near crater rims with higher vertical roughness variations (as observed in the slope and the curvature maps) and associate with collapse process of the steep and fractured wall slumps potentially. The slope and the curvature maps can provide clear observations of roughness signatures in crater rims, but other rough units (e.g. polygonal fractures) are defined as low roughness (as covered by blue-color shades). For instance, in FIGS. 18A, 18E and 18G of the Gassendi crater, the north-western part and the north-eastern part of the crater floor show rough morphologies, which are represented by the topographic reliefs. There exist some fragmented roughness shapes in the southern parts, which are caused by vertical roughness variations. These shapes demonstrate that there is a cluster of sharp or deep geological units in this regions. From an observation in Quickmap (http://target.lroc.asu.edu/q3/#/), the bright convex rocks and deep holes (some are secondary craters) correspond with these fragmented roughness shapes.

FIGS. 20A to 20H and FIGS. 21A to 21H provide another multiscale analysis of the roughness signatures. These figures include plots between the roughness measurements by the OR, AR, slope and curvature) and different moving-window sizes are utilized for analyzing the statistical changes following the increases of the moving windows. Meter-scale (i.e. small moving window size) roughness contrasts relate with modification processes and kilometer-scale (i.e. large moving window size) associates with major geological events. Since the used map scale is 0.118 km/pix (http://imbrium.mit.edu/DATA/SLDEM2015/TILES/FLOATIMG/SLDEM201525 60N60N000120FLOAT.LBL), the window sizes of 5×5, 7×7 and 9×9 can be considered approximately as of meter-scale, while other window sizes reflect the kilometer-scale changes. Thus, the multiscale plots demonstrate the changes of roughness textures from meter-scales to kilometer-scales.

Figure 21A:
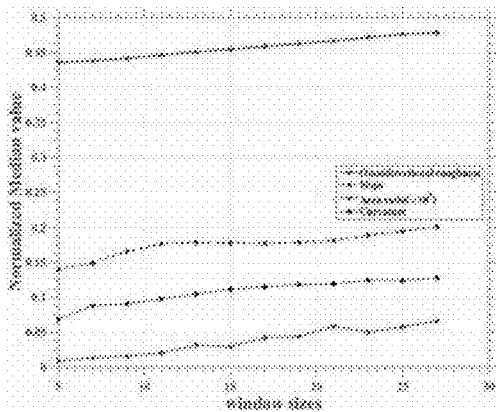
FIGS. 21A to 21H show normalized standard deviations of sampling craters versus different moving-window sizes in accordance with an example embodiment.
Figure 21B:
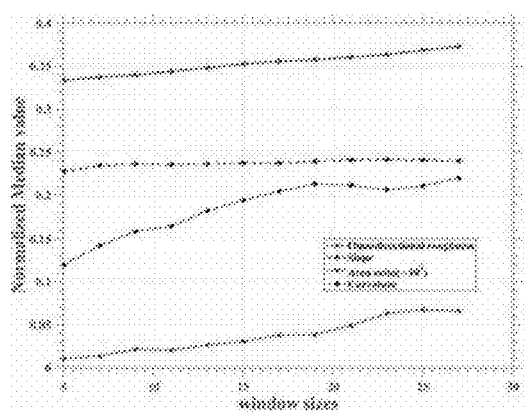
Figure 21C:
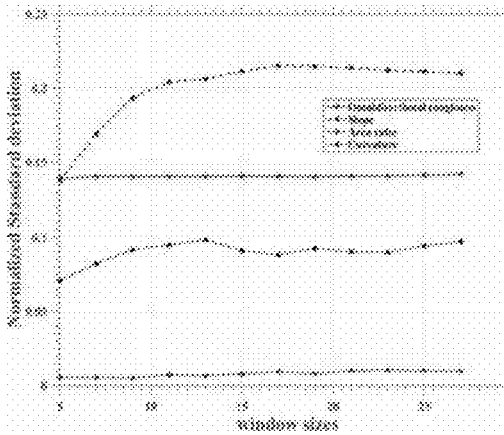
Figure 21D:
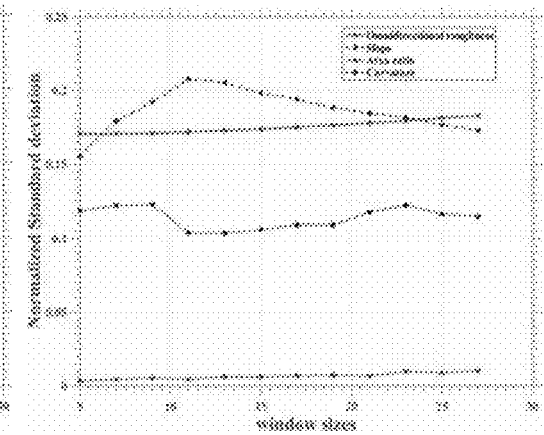
Figure 21E:
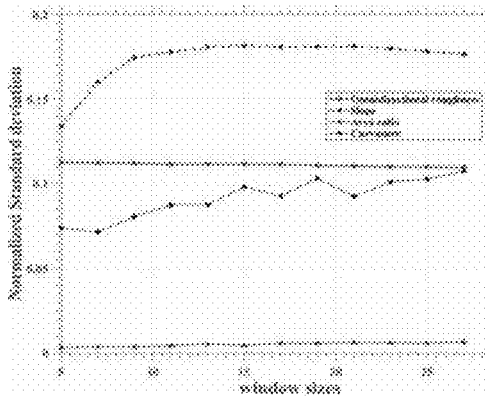
Figure 21F:
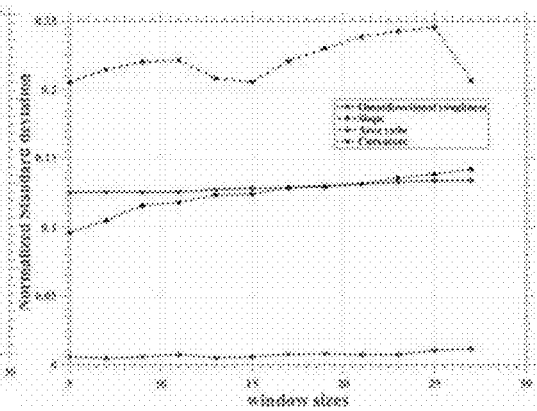
Figure 21G:
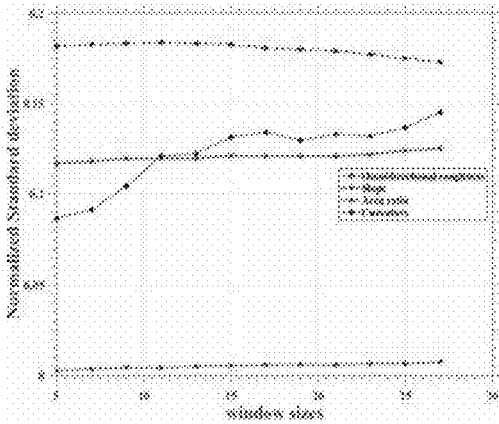
Figure 21H:
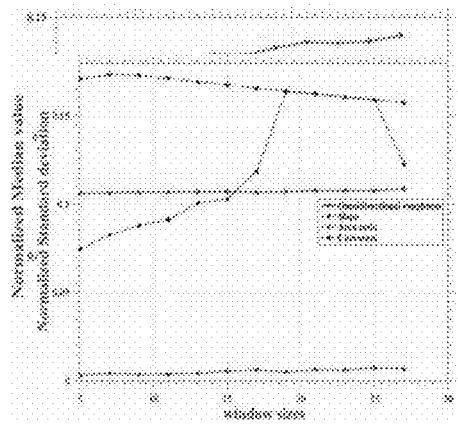

All normalized median values of the OR are higher than other roughness measurements except for the Kostinskiy crater (as shown in FIG. 21F). The slopes of the Kostinskiy crater show higher values (from 0.41 to 0.55) than other roughness values. However, the change of slopes is unstable, since there is a sudden decrease when the moving-window size is large than 25. Decreases in most of the other slope decreases happen in the FFCs, especially for the Gassendi (Class 5) and the Fracastorius (Class 6) craters. The curvature and area ratio (×10$^3$) maps show increasing trends following the changes of the moving windows. However, the area ratio map shows a more stable distribution by their increasing trends. In particular, the meter-scale roughness of the Gassendi crater may be affected more by steep slopes (vertical variations), since the slope values are much higher than the OR values at meter scales. However, the curvature map shows contrary changes by increasing with an exponential growth at meter scales. As shown in FIGS. 18A to 18I, the slope maps highlight that all the terrace walls have high roughness values, and the curvature maps demonstrate that the sharp decrease of wall slumps have higher roughness contrasts. As discussed above, the surfaces of the terrace walls are flat and smooth. Therefore, the slope maps provide some unreasonable roughness shapes. The OR maps indicate similar roughness variations as those in the curvature maps, which can be reflected by the statistical distributions in FIGS. 20A to 20H. Nevertheless, the OR maps provide more details of the horizontal roughness variations than the curvature maps. Therefore, the median values of the OR are higher and can provide a reasonable description to interpret the complicated and irregular distributions in craters.

Normalized standard deviations, as illustrated in FIGS. 21A to 21H, show the other style of roughness quantifications. The square root of the variances of the roughness matrixes denotes the statistical variations of roughness textures. The trends of young craters (as shown in FIGS. 21A to 21D) increase more rapidly than those of FFCs (as shown in FIGS. 21E to 21H) in the OR maps. The slope and the curvature maps show unstable variances. The area ratio maps have similar increasing trends of those in the OR maps. From an observational result, vertical variations of roughness vary more rapidly than horizontal variations. According to the analysis above, the horizontal roughness variations are affected by high-density geological units. These roughness values are close to the mean values of the roughness matrixes. Therefore, most values of the OR maps are lower than the values in the slope maps. Although standard deviation maps reduce the effect of horizontal variations of roughness textures, some significant roughness signatures can be found statistically. For instance, young craters show clear increases in their maps. These variations relate with the values of color shades in FIGS. 12A to 15I. King crater does not show high-density roughness distribution in its central regions and the central roughness values (~0.4) are also lower than those in other young craters (~0.6), so the increasing rate is lower than other young craters.

Moreover, FFCs indicate more stable variations in their plots, because their floors are lower than the floors of the young craters and most of the roughness effects in their floors are fractured and irregular units. The clusters of high-density roughness textures have lower values than those in young craters, most of these regions have normalized values of 0.2.

Surface roughness measurements are sensitive to the source data. Therefore, to compare the effects of roughness measurements in different source data is meaningless. New findings in used data and roughness algorithms are focused. Surface roughness is often used as a topographic expression at given horizontal scales. Planetary geologists are interested in the quantitative characterization of surface roughness, which can provide some surprising geological variations that are hard to observe in high-resolution images. For other reasons, it is time-consuming for geologists to switch the topographic map from large scale to small scale if they find some interesting units in large-scale topographic maps. Sometimes these observations are visual errors caused by the subtle variations of grey levels from images. The intuitive observations in DEMs are disturbed by the complicated structures. In other words, DEMs are mapped by some types of color shades to highlight and distinguish the topographic variations. Although this measurement is useful but only the prominent geological units (i.e. sharp rock or deep valleys) can be distinguished easily. For global topographic analysis, this observation is meaningless because the resolutions of topographic maps are lower than the resolutions of the CCD images. For typical topographic analysis, some topographic signatures are overlapped or ignored by the measurements based on the units with high vertical variations. A composite color map is used to solve this problem. This color map is overlapped with the given roughness maps at three different scales. Thus, small-scale roughness textures can be shown by vertical measurements based on the source data of the LOLA RDR and provide an isotropic overview of global topographic variations.

In an example embodiment, gridded DEMs can provide a more convenient computing environment to represent the isotropic characteristics of roughness signatures. However, previous measurements cannot quantify the three-dimensional roughness by containing all the information of the DEMs. For example, a slope algorithm only uses the western, the eastern, the northern and the southern points in the boundary of the data matrixes (as shown in FIG. 5A), other points are useless in a given moving window. In FIG. 5A, blue line is for the calculation of a slope in a longitude (x) direction and green line is for the calculation of a slope in a latitude (y) direction. Each point in a DEM plays an important role for constructing the topographic morphologies. Therefore, in one example embodiment, an OR algorithm is used to reflect these topographic features. In another example embodiment, TFC is used to denote the horizontal roughness variations, which are often caused by high-density geological clusters. These irregular units are always low-rise (as illustrated in the profiles of a-a' and b-b' profiles in FIG. 11A) and represent the roughness signatures by their high-density distributions in a local area. For vertical variations, previous algorithms use the quantifiable interpretation of the vertical difference to define surface roughness. The common measurement is root-mean-square (RMS). This measurement interprets the surface roughness by using the differences between each points in DEMs and mean values of these points. Nevertheless, mean values cannot reflect the fluctuations of topography accurately, because sometimes the mean values may be higher or lower than the elevations in undulant areas. Therefore, RMS can only highlight the high vertical roughness variations but it is not suitable for an accurate interpretation of surface roughness textures. In a profile as shown in FIG. 6, topographic highs and lows provide an intuitive roughness texture. In one example embodiment, the MSR is utilized to extract these roughness characteristics from DEMs. As discussed above, structuring elements (SEs) can determine the shapes of moving windows for extracting the useful vertical roughness characteristics.

On the other hand, surface roughness is always used as a parameter to quantify the topographic feature in an area. In order to find topographic units or variations from roughness maps, multiscale analysis is used in the process of mapping roughness. Therefore, surface roughness is considered as a scale-dependent parameter. There are various definitions of scales. For example, roughness at different DEMs are mapped with spatial resolutions and sizes of the moving windows. In one example embodiment, different resolutions and sizes of the moving windows denote a scale respectively. In the LOLA RDR, the length of the baseline (i.e. the distance between two points along the collecting tracks on a space craft) is a scale. In an example embodiment, the size of the moving window is defined as a scale. Moreover, there are two steps for the moving window sliding over the DEMs. One is one-to-one point step in which the mapped roughness reflects the interaction between the central point and its surrounding points in a moving window. The profile in this roughness matrix reflects a tendency of local roughness variations. The other step is equal to the size of the moving window. In each of the moving windows, all the values are filled as the roughness values of the local regions. This result represents that global roughness is displayed by individual roughness textures. In a word, one-to-one point step indicates the roughness tendency and the second one focuses on independent roughness variations in a local region. In one example embodiment, the one-to-one point step is used for analyzing the changing trend of roughness signatures. It is more convenient to represent the roughness changes when a window slides over the DEMs.

Some of the surface roughness are global mapping. In one example embodiment, some typical areas from global roughness maps are extracted for geological analysis. Because of the limitation of the DEM resolutions, most of the roughness textures in typical area are fuzzy. On the other hand, some high-resolution gridded DEMs are interpolated heavily in which some peculiar bands of roughness textures are indicated, which are considered as the effect of interpolated points. In an example embodiment, the SLDEM2015 solves this interpolated problem by using Kaguya images and its resolution is high enough for typical roughness mapping. As for the other reason, lunar craters exhibit a huge distribution of its circular shapes on the surface of the Moon. These lunar craters are related to specific geomorphologic units, which preserve much of lunar magnetic and impact record. Thus, it is significant to understand the roughness signatures of lunar craters. In one example embodiment, interior deposits indicate high roughness contrasts and relate with the small and high-density fragments or rock distributions.

In an example embodiment, roughness of lunar craters with moving windows of twelve different sizes are mapped. In one example embodiment, to contain all the topographic information of a three-dimensional DEM, a roughness measurement called omnidirectional roughness (OR) is used. The roughness signature of a DEM is divided as horizontal roughness and vertical roughness. In another example embodiment, for horizontal roughness, a measurement called topographic frequency coefficient (TFC), which is based on FFT algorithm, is used. This roughness variations are highlight in crater interior, especially in young craters. In one example embodiment, for vertical variations, morphological surface roughness (MSR), which is successful for global roughness mapping, is used to extract roughness characteristics (e.g. topographic highs and lows) from DEMs. For geological analysis of vertical roughness variations in lunar craters, the crater rims and sharp fractured units are more affected by MSR than those by TFC. These two roughness measurements are merged as a definition of surface roughness in the OR for topographic study of lunar craters.

In an example embodiment, an omnidirectional measurement for roughness mapping in the SLDEM2015 is provided, which represents a high-resolution topography for typical extractions of lunar craters. The OR quantifies roughness signatures by containing all the information of the points in regions, which is determined by a moving window. One-to-one point step can reflect the scale-dependence of roughness textures and indicate several geological properties in roughness maps. By way of example, focus can be put on that the roughness measurement must reflect topographic variations more accurately. In another example embodiment, the value of roughness texture can be used as a reasonable parameter in topographic modelling.

Figure 22:
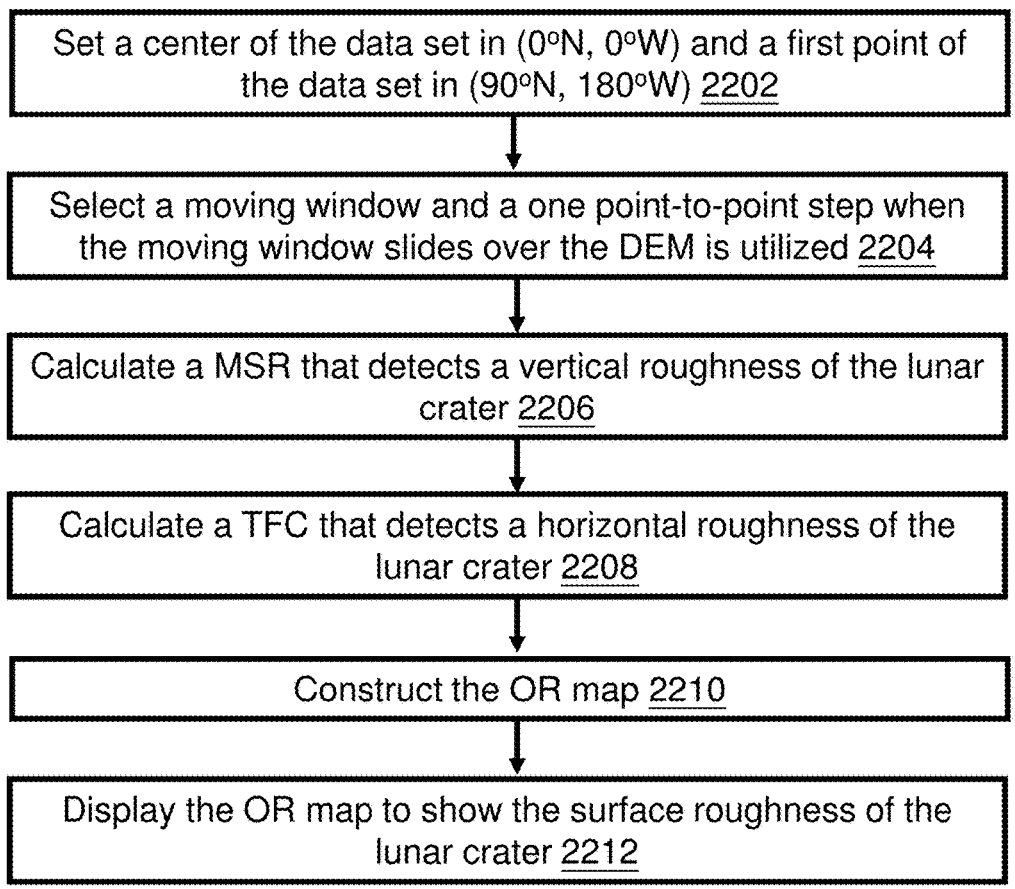
FIG. 22 shows a method executed by a computer system to construct an OR map of a lunar crater based on a data set of a DEM of surface textures of the lunar crater in accordance with an example embodiment.

FIG. 22 shows a method executed by a computer system to construct an OR map of a lunar crater based on a data set of a DEM of surface textures of the lunar crater. A center of the data set is set in (0°N, 0°W) and a first point of the data set is set in (90°N, 180°W) in box 2202. A moving window is selected and a one point-to-point step when the moving window slides over the DEM is utilized in box 2204.

A MSR that detects a vertical roughness of the lunar crater is calculated in box 2206. A TFC that detects a horizontal roughness of the lunar crater is calculated in box 2208. The OR map is constructed in box 2210 and is displayed to show the surface roughness of the lunar crater in box 2212.

Figure 23:
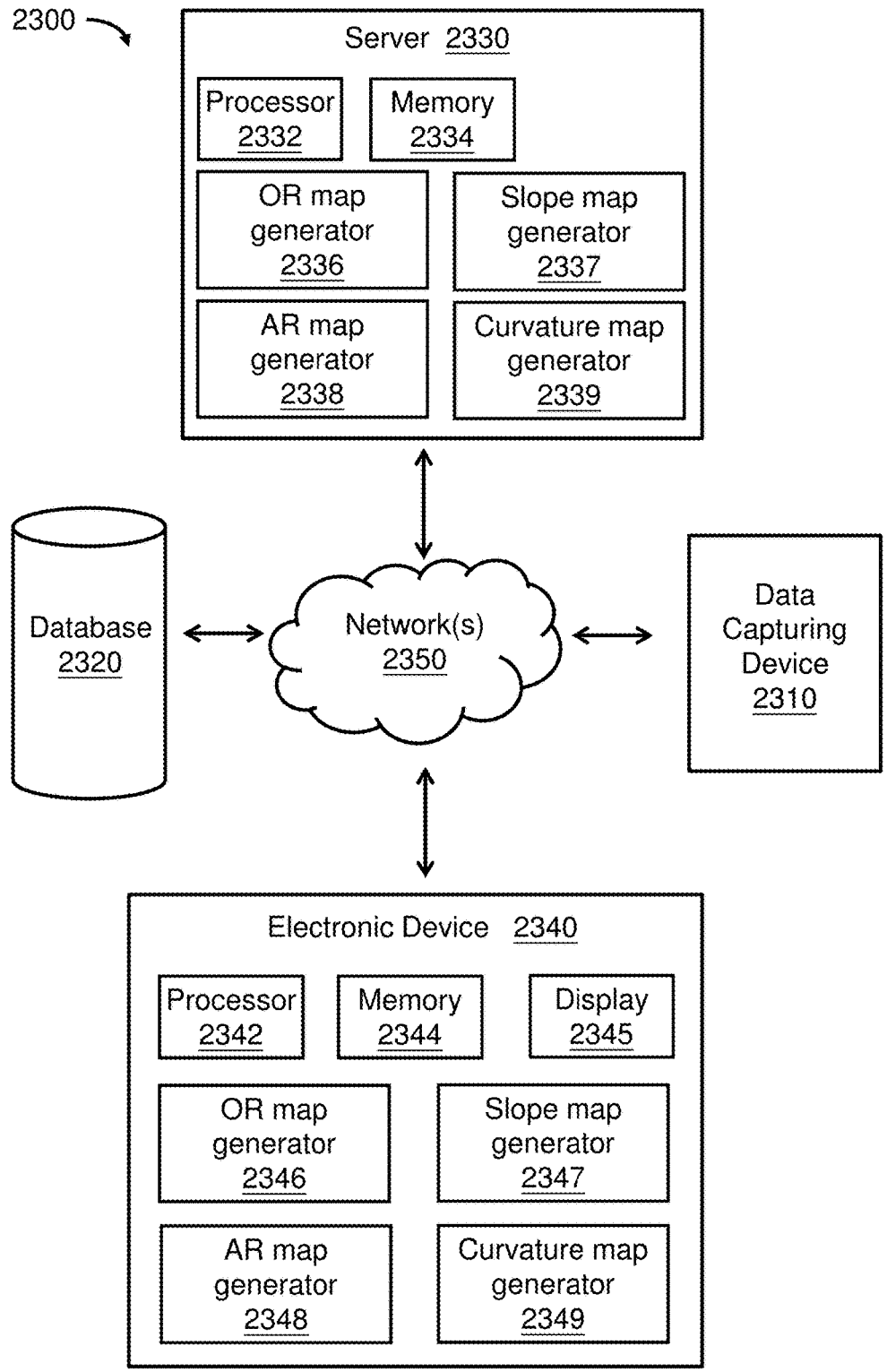
FIG. 23 shows a computer system that generates and displays an OR map of a lunar crater in accordance with an example embodiment.

FIG. 23 shows a computer system 2300 that generates and displays an omnidirectional roughness (OR) map of a lunar crater in accordance with an example embodiment. The computer system 2300 includes a data capturing device 2310, a database 2320, a server 2330, and an electronic device 2340 in communications via one or more networks 2350.

The data capturing device 2310 includes one or more devices to capture data of a digital elevation model (DEM), such as a merged lunar orbiter laser altimeter (LOLA) Kaguya lunar digital elevation model (SLDEM2015)

The database 2320 includes electronic storage or memory and can store the data or other information to assist in executing example embodiments.

The server 2330 includes a processor or a processing unit 2332, a memory 2334, and an OR map generator 2336, a slope map generator 2337, an area ratio (AR) map generator 2338 and a curvature map generator 2339.

The electronic device 2340 includes a processor or a processing unit 2342, a memory 2344, a display 2345, an OR map generator 2346, a slope map generator 2347, an AR map generator 2348 and a curvature map generator 2349. Examples of an electronic device include, but are not limited to, laptop computers, desktop computers, tablet computers, handheld portable electronic devices (HPEDs), and other portable and non-portable electronic devices.

The networks 2350 include one or more of the internet, an intranet, an extranet, a cellular network, a local area network (LAN), a home area network (HAN), metropolitan area network (MAN), a wide area network (WAN), a Bluetooth network, public and private networks, etc.

The processor, the memory, the OR map generator, the slope map generator, the AR map generator, and/or the curvature map generator in the server 2330 and/or electronic device 2340 execute methods in accordance with example embodiments. The OR map generator, the slope map generator, the AR map generator, and the curvature map generator can include software and/or specialized hardware to execute example embodiments. For example, the OR map generator, the slope map generator, the AR map generator, and the curvature map generator are instructions that are executed by the processor unit. Alternatively, they are hardware, such as a specialized or customized application-specific integrated circuit (ASIC) or field programmable gate array (FPGA). Furthermore, these hardware generators can be provided with the CPU or other processor, such as being integrated with an integrated circuit as a system on chip (SoC).

The processor unit includes a processor (such as a central processing unit, CPU, microprocessor, microcontrollers, field programmable gate array (FPGA), application-specific integrated circuit (ASIC), etc.) for controlling the overall operation of memory (such as random access memory (RAM) for temporary data storage, read only memory (ROM) for permanent data storage, and firmware). The processing unit, the OR map generator, the slope map generator, the AR map generator, and the curvature map generator communicate with each other and memory and perform operations and tasks that implement one or more blocks of the flow diagrams discussed herein. The memory, for example, stores applications, data, programs, algorithms (including software to implement or assist in implementing example embodiments) and other data.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Blocks and/or methods discussed herein can be executed by a software application, an electronic device, a program, a computer, firmware, hardware, a process, and/or a computer system. Furthermore, blocks and/or methods discussed herein can be executed automatically with or without instruction from a user.

The methods and apparatus in accordance with example embodiments are provided as examples, and examples from one method or apparatus should not be construed to limit examples from another method or apparatus. Further, methods and apparatus discussed within different figures can be added to or exchanged with methods and apparatus in other figures. Further yet, specific numerical data values (such as specific quantities, numbers, categories, etc.) or other specific information should be interpreted as illustrative for discussing example embodiments.

What is claimed is:

1. A method executed by a computer system to construct an omnidirectional roughness (OR) map of a lunar crater based on a data set of a digital elevation model (DEM) of surface textures of the lunar crater, the method comprising:
    setting, by the computer system, a center of the data set in (0°N, 0°W) and a first point of the data set in (90°N, 180°W);
    selecting, by the computer system, a moving window;
    utilizing, by the computer system, a one point-to-point step when the moving window slides over the DEM;
    calculating, by the computer system, a morphological surface roughness (MSR) that detects a vertical roughness of the lunar crater by:
        performing, by the computer system, a closing morphological operation ($R_{closing}(l)$) that detects topographic lows in which a value of each point in an output data of the closing morphological operation is calculated by comparing corresponding points in an input data of the closing morphological operation with its neighbors;
        performing, by the computer system, an opening morphological operation ($R_{opening}(l)$) that detects topographic highs in which a value of each point in an output data of the opening morphological operation is calculated by comparing corresponding points in an input data of the opening morphological operation with its neighbors;
        calculating the MSR by:

$$MSR = R_{closing}(l) - R_{opening}(l)$$

where l is a size of a structuring element (SE);
    calculating, by the computer system, a topographic frequency coefficient (TFC) that detects a horizontal roughness of the lunar crater by:
        calculating, by the computer system, a spectrum of a discrete Fourier transform (DFT) in the moving window of a size of $w_x \times w_y$ by:

$$z_{DFT}(x,y) = \sum_{m=x-\frac{w_x}{2}}^{x+\frac{w_x}{2}} \sum_{n=y-\frac{w_y}{2}}^{y+\frac{w_y}{2}} z(m,n) e^{-2\pi i \left(\frac{xm}{N_x} + \frac{yn}{N_y}\right)}$$

where z are elevations in DEM, $N_x$ are elevation numbers of z in an x-direction, $N_y$ are elevation numbers of z in a y-direction, m and n are indices of z, x and y are center indices in each of the moving window, and $Z_{DFT}$ is a sequence of components that describes the spectrum of DFT;

calculating, by the computer system, the TFC by:

$$TFC = \sqrt{\sum \frac{1}{N_x^2 N_y^2}(z_{DFT})^2} \;;$$

constructing, by the computer system, the OR map by:

$$OR = \sqrt{(TFC)^2 + (MSR)^2}; \text{ and}$$

displaying, by the computer system, the OR map to show a surface roughness of the lunar crater.

2. The method of claim 1, wherein the data set of the DEM is a merged lunar orbiter laser altimeter (LOLA) Kaguya lunar digital elevation model (SLDEM2015).

3. The method of claim 1, wherein the moving window has a size selected from a group consisting of 5×5, 7×7, 9×9, 11×11, 13×13, 15×15, 17×17, 19×19, 21×21, 23×23, 25×25, and 27×27 pixels.

4. The method of claim 1, wherein the SE is a rectangular SE.

5. The method of claim 1, wherein the lunar crater is selected from a group consisting of Tycho crater, Jackson crater, King crater, Copernicus crater, Humboldt crater, Kostinskiy crater, Gassendi crater, and Fracastorius crater.

6. The method of claim 1, further comprising:
setting values of the OR map within a range of 0 and $\sqrt{2}$.

7. A computer system that generates and displays an omnidirectional roughness (OR) map of a lunar crater, the computer system comprising:
at least one processor;
a display; and
a non-transitory computer-readable medium having stored therein instructions that when executed cause the processor to:
generate an OR map from a data set of a digital elevation model (DEM) of surface textures of the lunar crater by the steps of:
receiving the data set and set a center of the data set in (0° N, 0° W) and a first point of the data set in (90° N, 180° W);
selecting a moving window and utilizes a one point-to-point step when the moving window slides over the DEM;
generating a morphological surface roughness (MSR) that detects a vertical roughness of the lunar crater by:

$$MSR = R_{closing}(l) - R_{opening}(l)$$

where $R_{closing}(l)$ detects topographic lows in a closing morphological operation, $R_{opening}(l)$ detects topographic highs in an opening morphological operation, and l is a size of a structuring element (SE);
generating a topographic frequency coefficient (TFC) that detects a horizontal roughness of the lunar crater by:

$$TFC = \sqrt{\sum \frac{1}{N_x^2 N_y^2}(z_{DFT})^2}$$

where $N_x$ are elevation numbers of elevations in DEM (z) in an x-direction, $N_y$ are elevation numbers of z in a y-direction, x and y are center indices in each of the moving window, and $Z_{DFT}$ is a sequence of components that describes the spectrum of DFT; and
generating the OR map by:

$$OR = \sqrt{(TFC)^2 + (MSR)^2};$$

generate a slope map from the data set of the DEM of the surface textures of the lunar crater;
generate an area ratio (AR) map from the data set of the DEM of the surface textures of the lunar crater;
generate a curvature map from the data set of the DEM of the surface textures of the lunar crater; and
display, on a display, simultaneously the OR map, the AR map, the slope map, and the curvature map.

8. The computer system of claim 7, wherein the moving window has a size selected from a group consisting of 5×5, 7×7, 9×9, 11×11, 13×13, 15×15, 17×17, 19×19, 21×21, 23×23, 25×25, and 27×27 pixels.

9. The computer system of claim 7, wherein the SE is a rectangular SE.

10. The computer system of claim 7, wherein the lunar crater is selected from a group consisting of Tycho crater, Jackson crater, King crater, Copernicus crater, Humboldt crater, Kostinskiy crater, Gassendi crater, and Fracastorius crater.

11. The computer system of claim 7, wherein values of the OR map is set within a range of 0 and $\sqrt{2}$.

12. A method executed by a computer system to analyze and display surface roughness of a lunar crater based on a data matrix of a digital elevation model (DEM) of surface textures of the lunar crater, the method comprising:
constructing, by the computer system, an omnidirectional roughness (OR) map of the lunar crater by:
setting, by the computer system, a center of the data matrix in (0°N, 0°W) and a first point of the data matrix in (90°N, 180°W);
selecting, by the computer system, a moving window;
utilizing, by the computer system, a one point-to-point step when the moving window slides over the DEM;
calculating, by the computer system, a morphological surface roughness (MSR) that detects a vertical roughness of the lunar crater by:
performing, by the computer system, a closing morphological operation ($R_{closing}(l)$) that detects topographic lows in which a value of each point in an output data of the closing morphological operation is calculated by comparing corresponding points in an input data of the closing morphological operation with its neighbors;
performing, by the computer system, an opening morphological operation ($R_{opening}(l)$) that detects topographic highs in which a value of each point in an output data of the opening morphological operation is calculated by comparing corresponding points in an input data of the opening morphological operation with its neighbors;
calculating, by the computer system, the MSR by:

$$MSR = R_{closing}(l) - R_{opening} \qquad (1)$$

where l is a size of a structuring element (SE);

calculating a topographic frequency coefficient (TFC) that detects a horizontal roughness of the lunar crater by:
calculating, by the computer system, a spectrum of a discrete Fourier transform (DFT) in the moving window of a size of $w_x \times w_y$ by:

$$z_{DFT}(x, y) = \sum_{m=x-\frac{w_x}{2}}^{x+\frac{w_x}{2}} \sum_{n=y-\frac{w_y}{2}}^{y+\frac{w_y}{2}} z(m, n) e^{-2\pi i \left(\frac{xm}{N_x} + \frac{yn}{N_y}\right)}$$

where z are elevations in DEM, $N_x$ are elevation numbers of z in an x-direction, $N_y$ are elevation numbers of z in a y-direction, m and n are indices of z, x and y are center indices in each of the moving window, and $Z_{DFT}$ is a sequence of components that describes the spectrum of DFT;
calculating, by the computer system, the TFC by:

$$TFC = \sqrt{\sum \frac{1}{N_x^2 N_y^2} (z_{DFT})^2} \ ;$$

constructing the OR map by:

$$OR = \sqrt{(TFC)^2 + (MSR)^2};$$

constructing, by the computer system, an area ratio (AR) map of the lunar crater;
constructing, by the computer system, a slope map of the lunar crater;
constructing, by the computer system, a curvature map of the lunar crater;
displaying, by the computer system, the OR map with the AR map, with the slope map, and with the curvature map to analyze the surface roughness of the lunar crater.

13. The method of claim 12, further comprising:
defining spacings along longitudes as $\Delta x$, spacings along latitudes as $\Delta y$, a neighboring spacing of $\Delta x$ as $\Delta x'$, and a neighboring spacing of $\Delta y$ as
obtaining coordinate points of boundaries in four directions of a northernmost direction, a southernmost direction, an easternmost direction, and a westernmost direction;
calculating a latitude value of a corresponding longitude circle at position i ($N_i$) by:

$$N_i = N_{most} - (i-1)\Delta f_N$$

where $N_{most}$ denotes a northernmost latitude, and $(i-1)\Delta f_N$ is a distance from the $N_{most}$ to a point in $(i-1)$ position;
calculating a longitude value of a corresponding latitude circle at position i ($W_i$) by:

$$W_i = W_{most} + (i-1)\Delta f_W$$

where $W_{most}$ denotes a westernmost latitude, and $(i-1)\Delta f_W$ is a distance from the $W_{most}$ to a point in $(i-1)$ position;
calculating a distance of angle from the $N_{most}$ to the point in $(i-1)$ position in a longitude circle ($\lambda_1$) by:

$$\lambda_1 = N_{most} - N_i (N_i \geq S_{most})$$

where $S_{most}$ denotes a southernmost latitude;
calculating a distance of angle from the $W_{most}$ to the point in $(i-1)$ position in a latitude circle ($\lambda_2$) by:

$$\lambda_2 = W_{most} + W_i (W_i \leq E_{most})$$

where $E_{most}$ denotes an easternmost latitude;

estimating a length of $\Delta x$ by:

$$\Delta x = 2\pi R \left| \sin\left(\frac{\pi}{2} - \lambda_1\right) / (N-1) \right|$$

where N is an amount of a row of the data matrix;
estimating a length of $\Delta y$ by:

$$\Delta y = 2\pi R |\cos(\pi + \lambda_2)/(M-1)|$$

where M is an amount of a column of the data matrix; and
constructing the AR map by:

$$AR = \text{MAX}\left(\frac{s_{\Delta a} + s_{\Delta b}}{s_{\Delta a}^t + s_{\Delta b}^t}, \frac{s_{\Delta a} + s_{\Delta b}}{s_{\Delta c}^t + s_{\Delta d}^t}, \frac{s_{\Delta c} + s_{\Delta d}}{s_{\Delta a}^t + s_{\Delta b}^t}, \frac{s_{\Delta c} + s_{\Delta d}}{s_{\Delta c}^t + s_{\Delta d}^t}\right)$$

where $s_{\Delta a}$, $s_{\Delta b}$, $s_{\Delta c}$ and $s_{\Delta d}$ are surface areas of the lunar crater, and $s_{\Delta a}^t$, $s_{\Delta b}^t$, $s_{\Delta c}^t$ and $s_{\Delta d}^t$ are projective areas of the lunar crater.

14. The method of claim 12, further comprising:
calculating a mean slope ($s_x$) between two neighboring elevations in an x-direction ($h_{A'}$ and $h_{B'}$) by:

$$s_x = \frac{h_{A'} - h_{B'}}{2\Delta x};$$

calculating a mean slope ($s_y$) between two neighboring elevations in a y-direction ($h_A$ and $h_B$) by:

$$s_y = \frac{h_A - h_B}{2\Delta y};$$

and
constructing the slope map by:

$$S = \sqrt{(s_x)^2 + (s_y)^2}.$$

15. The method of claim 12, further comprising:
calculating a mean curvature ($d_x$) between two neighboring slopes in an x-direction ($s_{A'}$ and $s_{B'}$) by:

$$d_x = \frac{s_{A'} - s_{B'}}{2\Delta x};$$

calculating a mean curvature ($d_y$) between two neighboring slopes in a y-direction ($s_A$ and $s_B$) by:

$$d_y = \frac{s_A - s_B}{2\Delta y};$$

and
constructing the curvature map by:

$$d = \sqrt{(d_x)^2 + (d_y)^2}.$$

16. The method of claim 12, wherein the data set of the DEM is a merged lunar orbiter laser altimeter (LOLA) Kaguya lunar digital elevation model (SLDEM2015).

17. The method of claim 12, wherein the moving window has a size selected from a group consisting of 5×5, 7×7, 9×9, 11×11, 13×13, 15×15, 17×17, 19×19, 21×21, 23×23, 25×25, and 27×27 pixels.

18. The method of claim 12, wherein the SE is a rectangular SE.

19. The method of claim 12, wherein the lunar crater is selected from a group consisting of Tycho crater, Jackson crater, King crater, Copernicus crater, Humbolt crater. Kostinskiy crater Gassendi crater, and Fracastorius crater.

* * * * *